US012624752B2

(12) United States Patent
Kaakarni et al.

(10) Patent No.: US 12,624,752 B2
(45) Date of Patent: May 12, 2026

(54) AXLE GEAR HOUSING WITH BI-DIRECTIONAL LUBRICATION CHANNELS

(71) Applicant: ArvinMeritor Technology, LLC, Troy, MI (US)

(72) Inventors: Waseem Kaakarni, Troy, MI (US); Andrew Bodary, Troy, MI (US); Robert Martin, Troy, MI (US)

(73) Assignee: ARVINMERITOR TECHNOLOGY, LLC, Troy, MI (US)

( * ) Notice: Subject to any disclaimer, the term of this patent is extended or adjusted under 35 U.S.C. 154(b) by 0 days.

(21) Appl. No.: 18/949,117

(22) Filed: Nov. 15, 2024

(65) Prior Publication Data

US 2025/0155014 A1      May 15, 2025

Related U.S. Application Data

(60) Provisional application No. 63/599,159, filed on Nov. 15, 2023.

(51) Int. Cl.
F16H 57/04 (2010.01)

(52) U.S. Cl.
CPC ..... F16H 57/0483 (2013.01); F16H 57/0423 (2013.01); F16H 57/0424 (2013.01); F16H 57/0457 (2013.01)

(58) Field of Classification Search
CPC ............. F16H 57/0483; F16H 57/0424; F16H 57/0423; F16H 57/0457; F16H 57/0421; F16H 57/042
See application file for complete search history.

(56) References Cited

U.S. PATENT DOCUMENTS

2010/0043594 A1* 2/2010 Hilker ................. F16H 57/0421
74/607
2023/0313879 A1* 10/2023 Kanase ............... F16H 57/0457
184/6.12

* cited by examiner

*Primary Examiner* — Timothy Hannon
(74) *Attorney, Agent, or Firm* — Faegre Drinker Biddle & Reath LLP

(57) ABSTRACT

An axle assembly including a differential carrier having a guide structure positioned in an upper portion of an interior face of the differential carrier. The guide structure includes a plurality of guides for directing the flow of lubricant during operation of the axle assembly. For example, the guide structure may include a plurality of guides, each guide having at least one surface on which to receive lubricant and direct flow of the received lubricant to at least one of a first feed opening and a second feed opening.

13 Claims, 15 Drawing Sheets

SECTION A-A

AXLE GEAR HOUSING WITH BI-DIRECTIONAL LUBRICATION CHANNELS

CROSS-REFERENCE TO RELATED APPLICATIONS

The present application claims the benefit of priority to U.S. Provisional Patent Application No. 63/599,159, filed Nov. 15, 2023, which is incorporated herein by reference in its entirety.

FIELD OF THE DISCLOSURE

The present disclosure relates generally to lubrication of axle assemblies. More particularly, the present disclosure relates to inclusion and/or integration of lubrication channels for lubrication of a corresponding axle assembly within the gear housing of the axle assembly.

BACKGROUND OF THE DISCLOSURE

Demand for hybrid electric and battery electric vehicles continues to increase and, correspondingly, demand for electric motor driven axles has also increased. To ensure proper operation of an electric motor driven axle, proper lubrication is needed. Conventional systems rely on the splashing of lubricant within the axle assembly during operation for lubrication of components. Such an arrangement may be unreliable, as there is no guarantee that the appropriate amount of lubrication reaches the necessary places.

SUMMARY OF THE DISCLOSURE

The present disclosure provides an axle assembly including a differential carrier having a guide structure positioned in an upper portion of an interior face of the differential carrier. The guide structure includes a plurality of guides for directing the flow of lubricant during operation of the axle assembly. For example, the guide structure may include a plurality of guides, each guide having at least one surface on which to receive lubricant and direct flow of the received lubricant to at least one of a first feed opening and a second feed opening.

In a first aspect of the disclosure, an axle assembly is disclosed. The axle assembly includes an axle housing defining a sump portion configured to house lubricant; a ring gear mounted within the axle housing so at least a portion of the ring gear is positioned within the sump portion to interact with the lubricant; and a differential carrier coupled to the axle housing and configured to support a differential assembly. The ring gear is configured to spin in a first direction in a first configuration so that the lubricant is moved in the first direction and to spin in a second direction in a second configuration so that the lubricant is moved in the second direction. The first direction is different than the second direction. The differential carrier includes an interior face facing the axle housing. The interior face of the differential carrier includes a guide structure positioned on the interior face. The guide structure has a first guide configured to receive lubricant from the sump portion when the ring gear is in the first configuration and when the ring gear is in the second configuration and a second guide configured to receive lubricant from the sump portion when the ring gear is in the first configuration and when the ring gear is in the second configuration. The first guide includes a first end positioned adjacent to a first feed opening of the differential carrier. The second guide includes a first end positioned adjacent to a second feed opening.

In another aspect of the disclosure, a differential carrier is disclosed. The differential carrier including a housing defining a central opening and an interior face surrounding the central opening; a first feed opening defined by the housing within the interior face; a second feed opening defined by the housing within the interior face; and a guide structure fixedly attached to the interior face. The guide structure includes a central portion, a first guide extending from the central portion away from the central opening, a second guide extending from the central portion toward the central opening, a third guide extending laterally from the central portion in a first direction, and a fourth guide extending laterally from the central portion in a second direction.

In yet another aspect of the disclosure, an axle assembly is disclosed. The axle assembly includes an axle housing defining a sump portion configured to house lubricant and a differential carrier coupled to the axle housing and configured to support a differential assembly. The differential carrier includes an interior face facing the axle housing and a guide structure fixed to an upper portion of the interior face. The guide structure includes a first guide extending laterally from a central portion of the guide structure, a second guide extending laterally from the central portion of the guide structure, a third guide extending longitudinally from the central portion of the guide structure in a first direction, and a fourth guide extending longitudinally from the central portion of the guide structure in a second direction. The first guide includes a first distal end positioned adjacent a first feed opening defined by the interior face. The second guide includes a first distal end positioned adjacent a second feed opening defined by the interior face.

In various aspects of the disclosure, the guide structure may be integrated with the differential carrier.

In various aspects of the disclosure, the first feed opening may be a motor feed opening and the second feed opening may be a pinion feed opening.

In various aspects of the disclosure, the guide structure may include a third guide. The third guide may have a first end positioned adjacent the second feed opening. The second guide may be positioned vertically above the third guide to define a gap between the second guide and the third guide. The first guide may be positioned at least partially between the second guide and the third guide.

In various aspects of the disclosure, the guide structure may be positioned within a top section of the differential carrier. The top section may be defined as an area above an opening configured to receive a drive pinion. A third guide may extend longitudinally from a top collector of the differential assembly toward the opening configured to receive the drive pinion.

In various aspects of the disclosure, the guide structure may define a first guide leg defining two guide surfaces, a second guide leg defining two guide surfaces, and a bifurcating guide defining four guide surfaces.

In various aspects of the disclosure, the first guide and the second guide may be longitudinally aligned relative to the central portion.

In various aspects of the disclosure, the third guide and the fourth guide may extend from the central portion in opposite directions.

In various aspects of the disclosure, the third guide and the fourth guide may each curve toward a general direction of the central opening.

In various aspects of the disclosure, a first end of the third guide opposite of the central portion may be positioned adjacent to the first feed opening.

In various aspects of the disclosure, a first end of the fourth guide opposite of the central portion may be positioned adjacent to the second feed opening.

In various aspects of the disclosure, the axle assembly may further include a first guide extending laterally from a central portion of the guide structure. The first guide may include a first distal end positioned adjacent a first feed opening defined by the interior face.

In various aspects of the disclosure, the axle assembly may further include a second guide extending laterally from the central portion of the guide structure. The second guide may include a first distal end positioned adjacent a second feed opening defined by the interior face.

In various aspects of the disclosure, the axle assembly may further include a third guide extending longitudinally from the central portion of the guide structure in a first direction and a fourth guide extending longitudinally from the central portion of the guide structure in a second direction. The third guide and the fourth guide may be longitudinally aligned. The first direction and the second direction may be opposite directions.

In various aspects of the disclosure, the guide structure may extend axially from the interior face of the differential carrier so that the guide structure is configured to receive lubricant.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
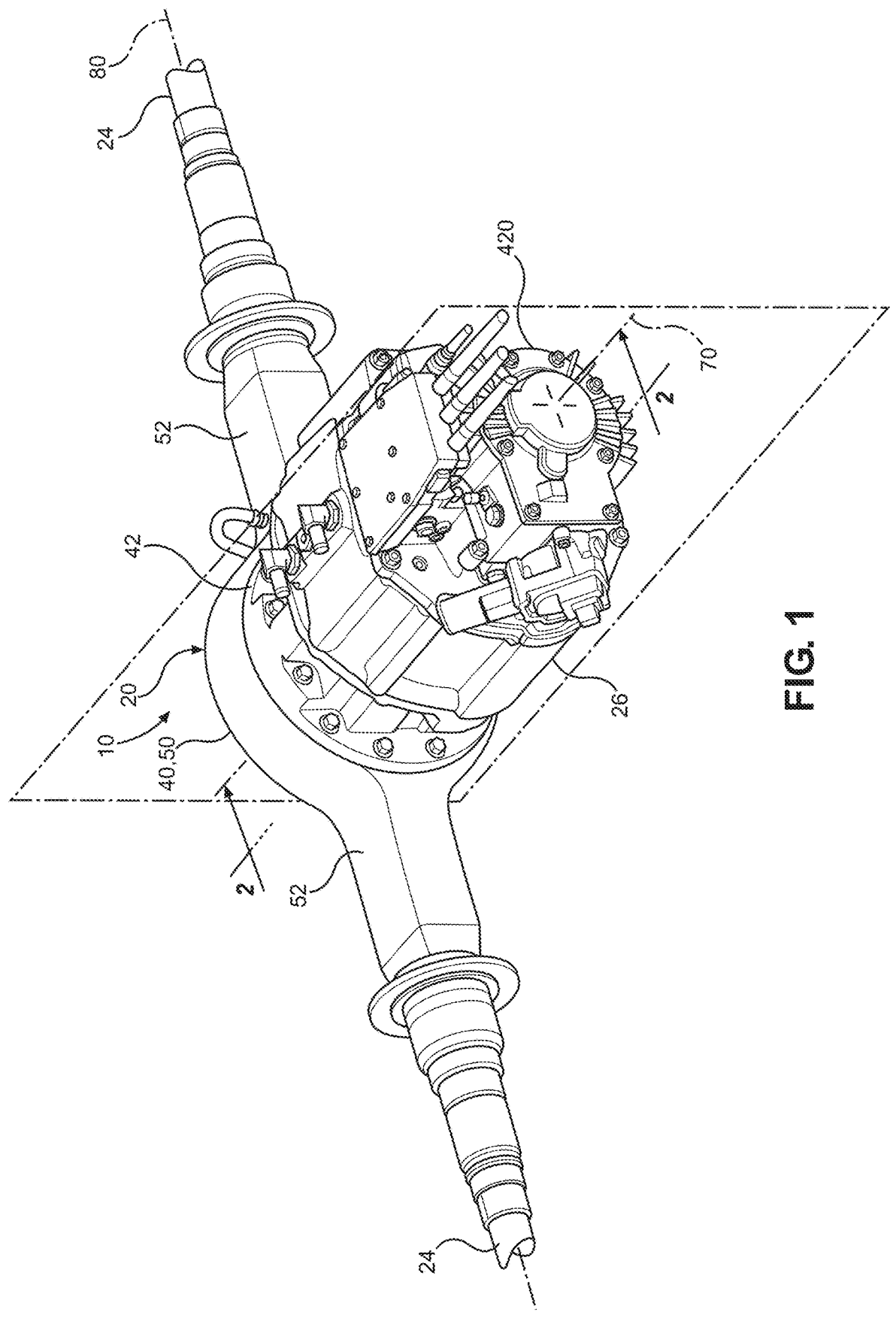
FIG. 1 illustrates a perspective view of an exemplary axle assembly of the disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 2:
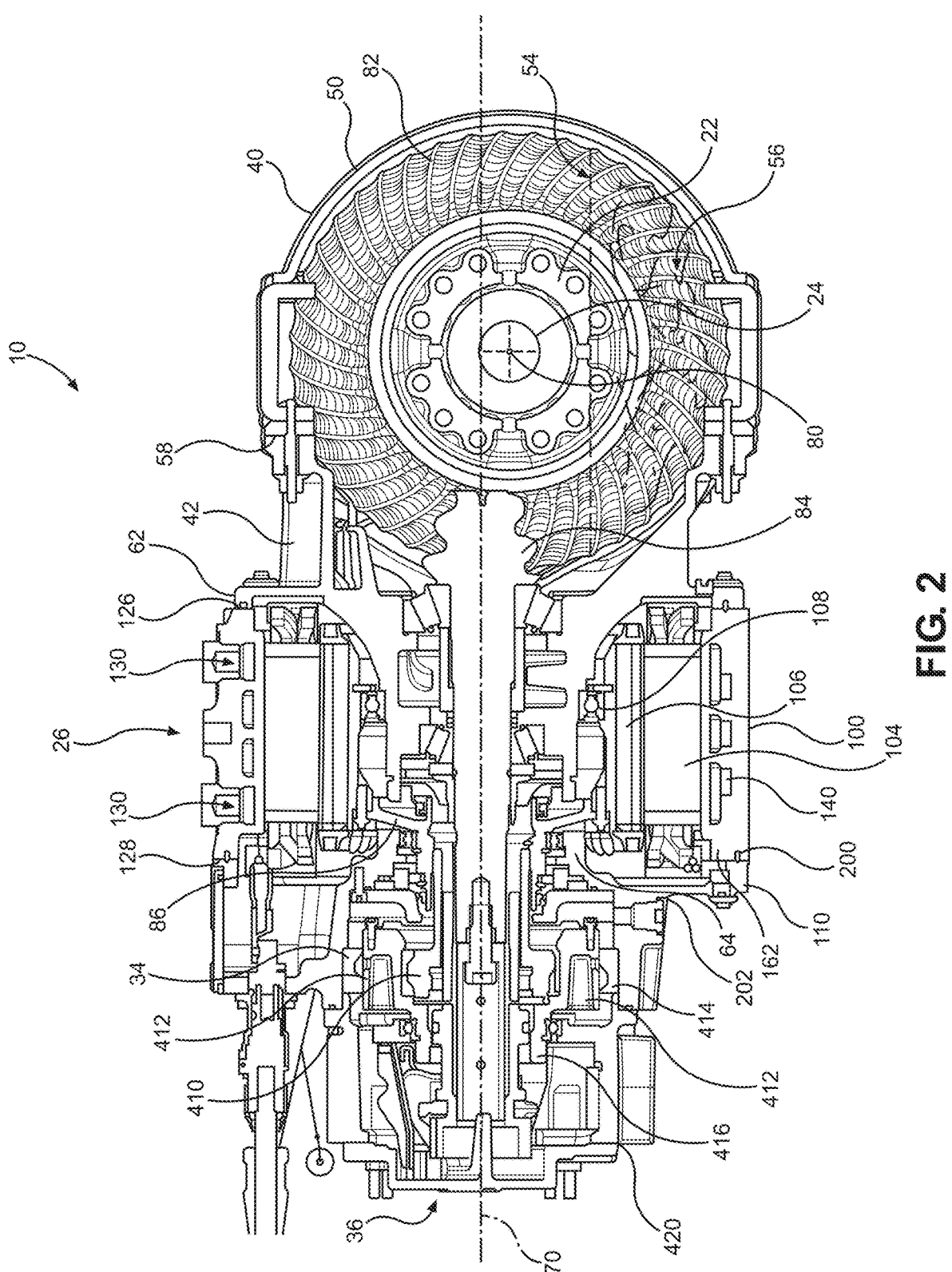
FIG. 2 illustrates a cross-section view of the axle assembly of FIG. 1 along section line 2-2 of FIG. 1.

Referring initially to FIGS. 1-2, an axle assembly 10 is illustrated. Axle assembly 10 may be configured for use with a vehicle, including hybrid electric vehicles, battery electric vehicles, internal combustion vehicles, and/or accessories to such vehicles—e.g., trailers, pull-behinds, or other vehicle accessories including an axle. "Vehicle" as used herein may refer to any of the above types of vehicles and/or vehicle accessories. Axle assembly 10 may provide torque to one or more traction assemblies of the vehicle. The one or more traction assemblies may include, for example, a wheel mounted on a wheel hub for rotation about an axis for movement of the vehicle. In some embodiments, the vehicle may include a plurality of axle assemblies 10.

Axle assembly 10 may include a housing assembly 20, a differential assembly 22, at least one axle shaft 24, and an electric motor module 26. Housing assembly 20 may receive and house components of axle assembly 10 and facilitate mounting of axle assembly 10 to the corresponding vehicle. In some embodiments, housing assembly 20 may include an axle housing 40 and a differential carrier 42. Axle housing 40 may receive and support axle shafts 24 via arm portions 52, positioned radially from a central portion 50 of axle housing 40. As illustrated, arm portions 52 and corresponding axle shafts 24 are positioned radially opposite each other relative to central portion 50. However, in other embodiments, arm portions 52 and corresponding axle shafts 24 may be otherwise positioned relative to the other of the arm portion(s) 52 and corresponding axle shaft(s) 24.

While FIG. 1 illustrates axle assembly 10 as including two arm portions 52 and two corresponding axle shafts 24, in other embodiments, axle assembly 10 may include more than two arm portion(s) 52 and/or axle shaft(s) 24. In embodiments including more than one arm portion 52, arm portions 52 may have substantially similar configurations as described further herein. In yet other embodiments, axle assembly 10 may include one arm portion 52 and/or one axle shaft 24 or no arm portion(s). Arm portion(s) 52 may be integral to central portion 50 or may be separate components that are permanently or removably attached to central portion 50 via mechanical fasteners, welding, adhesive, friction fit, compatible mating surfaces, or the like. Arm portion(s) 52 may have a hollow configuration or tubular configuration configured to receive and/or extend around corresponding axle shaft 24 and facilitate separation of corresponding axle shaft 24 or a portion thereof from the surrounding environment.

Central portion 50 may be positioned at or near the center of axle housing 40 and define a cavity that may at least partially receive differential assembly 22. Referring additionally to FIG. 2, a lower portion of central portion 50 may at least partially define a sump portion 54 configured to receive lubricant 56. Lubricant 56 in sump portion 54 may be splashed by a ring gear of differential assembly 22 during rotation of the axle as discussed further herein. Central portion 50 may further include a carrier mounting surface 58 to facilitate mounting of differential carrier 42 to axle housing 40. For example, carrier mounting surface 58 may face toward and engage differential carrier 42.

In some embodiments, carrier mounting surface 58 may include one or more holes corresponding with one or more holes of differential carrier 42. When the one or more holes of carrier mounting surface 58 are aligned with the one or more holes of differential carrier 42, the aligned holes may receive a fastener to couple differential carrier 42 to axle housing 40. In other embodiments, carrier mounting surface 58 may receive and couple with differential carrier 42 using other methods, including welding, adhesive, friction fit, compatible mating surfaces, or the like.

Referring additionally to FIGS. 3A-3D, differential carrier 42 may include one or more bearing supports 60, a mounting flange 62, and a bearing support wall 64. Differential carrier 42 may support differential assembly 22 and facilitate mounting of electric motor module 26 as described further herein. Bearing support 60 may support a roller bearing assembly that may rotatably support differential assembly 22. For example, two bearing supports 60 may be received in central portion 50 and may be located proximate opposite sides of differential assembly 22. Some embodiments may include a single bearing support.

Bearing support(s) 60 may be provided in various configurations. For example, bearing support 60 may include a pair of legs that extend from differential carrier 42. A bearing cap may be mounted to the legs and may arch over a roller bearing assembly that may rotatably support differential assembly 22. In another embodiment, bearing support 60 may be received in a roller bearing assembly, which in turn may support differential assembly 22. Mounting flange 62 may facilitate mounting of electric motor module 26.

Mounting flange 62 may be configured as a ring that may extend outward and away from an axis 70 and extend around axis 70. Mounting flange 62 may include a set of holes that may be configured to receive a fastener to secure electric motor module 26 to mounting flange 62.

Bearing support wall 64 may support bearings that may rotatably support other components of axle assembly 10. For example, bearing support wall 64 may support bearings that rotatably support a drive pinion 84, bearings that may rotatably support a rotor of electric motor module 26, or both. Bearing support wall 64 may extend in an axial direction away from axle housing 40 and may extend around axis 70. Bearing support wall 64 may define a hole 512 that may receive drive pinion 84. Bearing support wall 64 may be integrally formed with differential carrier 42 or may be a separate component that is coupled to differential carrier 42 via, for example, welding, mechanical fasteners, friction fit, compatible mating surfaces, adhesive, or the like.

Differential assembly 22 may be at least partially received in central portion 50 of housing assembly 20. Differential assembly 22 may be rotatable about differential axis 80 and may transmit torque to axle shaft(s) 24 and corresponding wheel(s) (not shown). Differential assembly 22 may be operatively coupled to axle shaft(s) 24 and permit axle shaft(s) 24 to rotate at varying rotational speeds. Differential assembly 22 may have a ring gear 82 that may have teeth to mate or mesh with teeth of a gear portion of a drive pinon 84. As such, differential assembly 22 may receive torque from drive pinion 84 via ring gear 82 and transmit torque to axle shaft(s) 24.

Axle shaft(s) 24 may transmit torque from differential assembly 22 to corresponding wheels. Axle shaft(s) 24 may extend along and/or be rotatable about differential axis 80. Each axle shaft 24 may have a first end operatively coupled to differential assembly 22 and a second end operatively coupled to a wheel. In some embodiments, drive pinion 84 may operatively couple a gear reduction module 34 to differential assembly 22. In some embodiments, gear reduction may be provided between axle shaft(s) 24 and corresponding wheel(s) (not shown).

In embodiments including gear reduction module 34, said gear reduction module 34 may transmit torque from electric motor module 26 to differential assembly 22. As such, gear reduction module 34 may be operatively coupled to electric motor module 26 and differential assembly 22. Gear reduction module 34 may be disposed outside of differential carrier 42 and may be primarily disposed outside of electric motor module 26, thereby providing a modular construction that may be mounted to electric motor module 26 when gear reduction is desired.

In embodiments including gear reduction module 34, gear reduction module 34 may be provided in various configurations, such as planetary gear set configurations and non-planetary gear set configurations. For example, in a planetary gear set configuration, gear reduction module 34 may include a sun gear 410, planet gears 412, planetary ring gear 414, and a planet gear carrier 416. Sun gear 410 may be operatively coupled to a rotor 106 of electric motor module 26 as described further herein, and, for example, may be coupled to rotor 106 via rotor output flange 86. Sun gear 410 may also be rotatable about axis 70 and may receive drive pinion 84.

In embodiments including gear reduction module 34, planet gears 412 may be rotatably disposed between sun gear 410 and planetary ring gear 414. Each planet gear 412 may have teeth that may mesh with sun gear 410 and planetary ring gear 414. Planetary ring gear 414 may extend around axis 70 and may receive planet gears 412. Planet gear carrier 416 may be rotatable about axis 70 and may rotatably support planet gears 412.

In embodiments including gear reduction module 34, a shift mechanism 36 may cooperate with gear reduction module 34 to provide a desired gear reduction ratio to change the torque provided from electric motor module 26 to the differential assembly 22, as discussed further herein, and hence to axle shaft(s) 24 of axle assembly 10. In at least one configuration, shift mechanism 36 may operatively couple sun gear 410 to drive pinion 84 to provide a first drive gear ratio and may operatively couple planet gear carrier 416 to drive pinion 84 to provide a second drive gear ratio. In some embodiments, the first drive gear ratio may differ from the second drive gear ratio. In other embodiments, the first drive gear ratio may be similar to or the same as the second drive gear ratio.

In embodiments including gear reduction module 34 and shift mechanism 36, said shift mechanism 36 may have any suitable configuration. For example, shift mechanism 36 may include one or more clutches of any suitable type. Shift mechanism 36 may be received in a shift mechanism housing 420. Shift mechanism housing 420 may be disposed on a cover 110 of electric motor module 26 as described further herein and may be mounted to a side of cover 110 that may be disposed opposite differential carrier 42. In some embodiments, shift mechanism housing 420 may facilitate mounting of an actuator that may actuate shift mechanism 36.

Still referring to FIGS. 1-2, and further referring to both embodiments including gear reduction module 34 and embodiments not including gear reduction module 34 throughout the remaining disclosure unless otherwise noted, electric motor module 26 may be mounted to differential carrier 42 and may provide torque to differential assembly 42 via drive pinion 84. Electric motor module 26 may be primarily disposed outside differential carrier 42. Additionally, electric motor module 26 may be axially positioned between axle housing 40 and gear reduction module 34 in embodiments including said gear reduction module 34. In at least one configuration, electric motor module 26 may include a motor housing 100, a coolant jacket 102, a stator 104, a rotor 106, at least one rotor bearing assembly 108, and a cover 110.

Figure 4A:
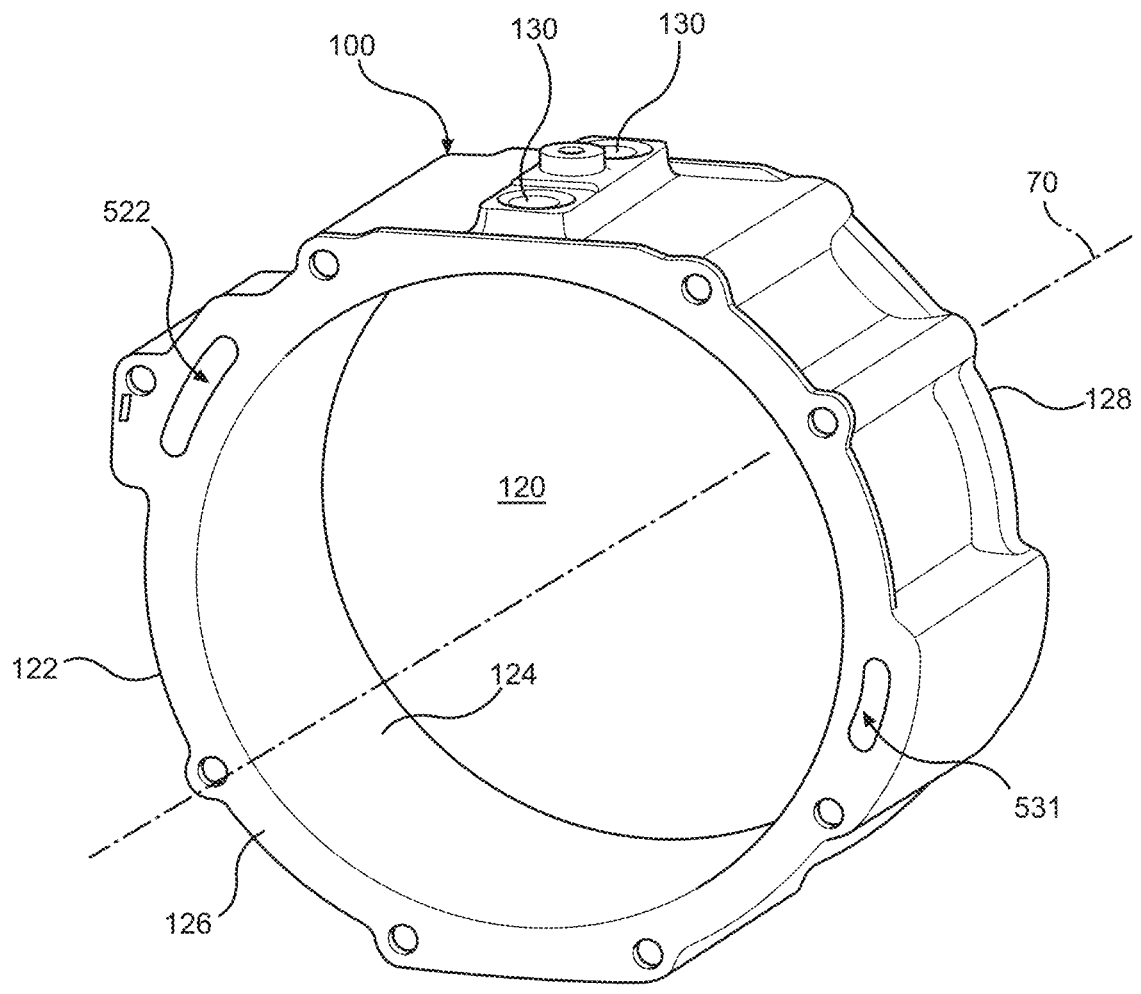
FIG. 4A is a first perspective view of a motor housing that may be provided with the axle assembly of FIG. 1.
Figure 4B:
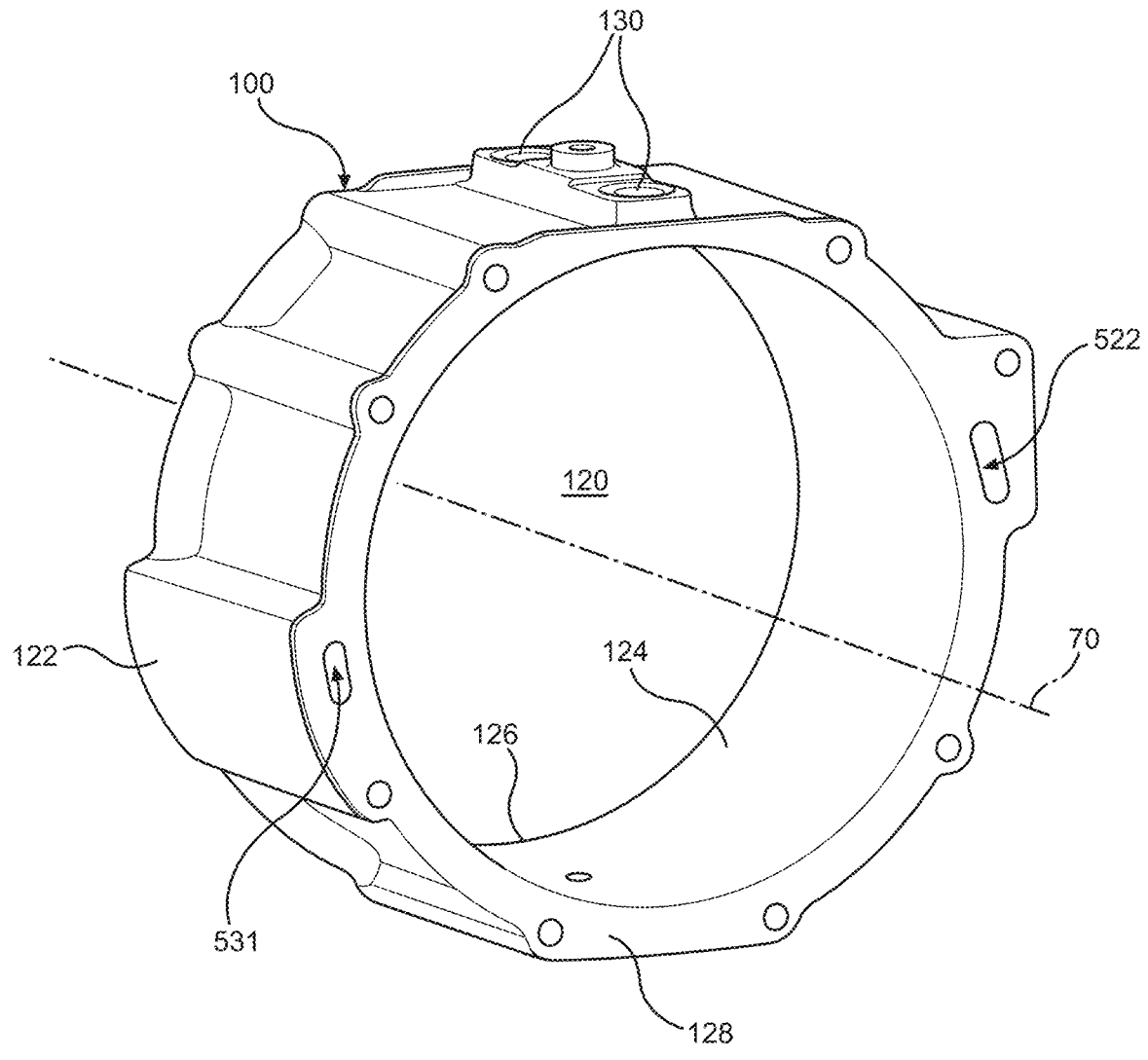
FIG. 4B is a second perspective view of the motor housing of FIG. 4A.

Motor housing 100 may extend between differential carrier 42 and cover 110 and may be mounted to differential carrier 42 and cover 110. For example, in some embodiments, motor housing 100 may extend from mounting flange 62 of differential carrier 42 to cover 110. Referring additionally to FIGS. 4A-4B, motor housing 100 may extend around axis 70 and define a motor housing cavity 120. In the illustrated embodiment, motor housing cavity 120 has a generally cylindrical configuration. In other embodiments, motor housing cavity 120 may have other configurations shaped and sized to carry out the functions as described herein. Motor housing 100 may extend continuously around bearing support wall 64 of differential carrier 42. In some embodiments, motor housing 100 may be spaced apart from bearing support wall 64 of differential carrier 42.

Motor housing 100 may have an exterior side 122, an interior side 124, a first end surface 126, a second end surface 128, and one or more ports 130. Exterior side 122 may face away from axis 70 and may define an exterior or outside surface of motor housing 100. Interior side 124 may be disposed opposite exterior side 122. In some embodiments, interior side 124 may be disposed at a substantially constant radial distance from axis 70. In other embodiments, interior side 124 may be disposed at a varying radial distance from axis 70.

First end surface 126 may extend between exterior side 122 and interior side 124. First end surface 126 may be disposed at an end of motor housing 100 that may face toward differential carrier 42 and/or may be disposed adjacent to mounting flange 62 of differential carrier 42. In some embodiments, motor housing 100 and first end surface 126 may be received inside mounting flange 62. In other embodiments, motor housing 100 and first end surface 126 may not be received inside mounting flange 62. Second end surface 128 may be disposed opposite first end surface 126 and may be disposed at an end of motor housing 100 that faces toward and is configured to engage to cover 110. Second end surface 128 may extend between exterior side 122 and interior side 124. In some embodiments, second end surface 128 may be received inside cover 110. In other embodiments, second end surface is not received inside cover 110.

One or more ports 130 may extend through motor housing 100. Ports 130 may be configured as through holes that may extend from exterior side 122 to interior side 124. Ports 130 may allow coolant, such as water, antifreeze/water mixture, glycol, or another fluid operable as a cooling material, to flow to and from coolant jacket 102. Coolant jacket 102 may facilitate cooling of or heat removal from stator 104. In some embodiments, coolant jacket 102 may be integrated with motor housing 100 as illustrated. In other embodiments, coolant jacket 102 may be received in motor housing cavity 120 of motor housing 100 and may engage interior side 124 of motor housing 100.

Coolant jacket 102 may extend axially between differential carrier 42 and cover 110. In addition, coolant jacket 102 may extend around axis 70 and stator 104. As such, stator 104 may be at least partially received in and/or encircled by coolant jacket 102. Moreover, coolant jacket 102 may extend in a radial direction from stator 104 through motor housing 100 and/or to interior side 124 of motor housing 100. In some embodiments, coolant jacket 102 may include a plurality of channels 140. In other embodiments, coolant jacket may include a single channel 140. In yet other embodiments, coolant jacket may not include any channels.

Channels 140 may extend around axis 70 and may be disposed opposite stator 104. Channels 140 may be configured with an open side facing away from axis 70 and toward interior side 124 of motor housing 100. Coolant may be provided to coolant jacket 102 via first port 130 and may exit coolant jacket 102 via second port 130. For example, coolant may flow from first port 130 into channels 140, receive heat from stator 104 as the coolant flows through channels 140, and exit at second port 130. A baffle may be provided with coolant jacket 102 that may reverse the direction of coolant flow to help route coolant from first port 130 to second port 130.

A motor feed passage 522 and/or a motor drain passage 531 may extend through motor housing 100 from first end surface 126 to second end surface 128 and/or vice versa. Motor feed passage 522 and motor drain passage 531 may facilitate the flow of lubricant throughout axle assembly 10 as described further herein. As illustrated, motor feed passage 522 and motor drain passage 531 may be positioned opposite of motor housing 100 relative to each other. In other embodiments, motor feed passage 522 and/or motor drain passage 531 may be otherwise positioned to facilitate flow of lubrication as described further herein.

Referring again to FIG. 2 in addition to FIGS. 4A-4B, stator 104 may be received in motor housing cavity 120. In some embodiments, stator 104 may be fixedly positioned with respect to coolant jacket 102. For example, stator 104 may extend around axis 70 and may include stator windings that may be received inside coolant jacket 102 and fixedly positioned in relation to coolant jacket 102. Rotor 106 may extend around and/or be rotatable about axis 70. Rotor 106 may be received inside one or any combination of stator 104, coolant jacket 102, and motor housing cavity 120 of motor housing 100. Rotor 106 may be rotatable about axis 70 with respect to differential carrier 42 and stator 104. In addition, rotor 106 may be spaced apart from stator 104 but may be positioned in close proximity to stator 104. Rotor 106 may include magnets or ferromagnetic material that may facilitate the generation of electrical current. Rotor 106 may extend around and/or be supported by bearing support wall 64.

One or more rotor bearing assemblies 108 may rotatably support rotor 106. For example, rotor bearing assembly 108 may receive bearing support wall 64 of differential carrier 42 and may be received inside rotor 106. Rotor 106 may be operatively coupled to drive pinion 84. For example, in embodiments including gear reduction module 34, a coupling such as a rotor output flange 86 may operatively couple rotor 106 to gear reduction module 34, which in turn may be operatively coupled with drive pinion 84.

Cover 110 may be mounted to motor housing 100 and/or may be disposed opposite axle housing 40 and differential carrier 42. For example, cover 110 may be mounted to second end surface 128 of motor housing 100. Cover 110 may be spaced apart from and may not engage differential carrier 42. Cover 110 may be provided in various configurations. In at least one embodiment, cover 110 may include a first side 200 and a second side 202. First side 200 may face toward and/or may engage motor housing 100. Second side 202 may be disposed opposite first side 200. Second side 202 may face away from motor housing 100 and/or may be disposed opposite motor housing 100.

As discussed above in relation to FIG. 2, during operation, ring gear 82 splashes lubricant 56 into lubricant passageways as discussed further herein. As discussed herein, ring gear 82 may rotate in either a first direction resulting in the lubricant being moved in a first direction, e.g., over the top of the ring gear, or a second direction resulting in the lubricant being moved in a second direction, e.g., swelling or splashing upward from the sump portion. The second direction may be opposite of the first direction. Other directions of lubricant movement are contemplated and included by the disclosure. For example, it is possible that lubricant is splashed and/or swelled in more than two directions, regardless of the direction the ring gear spins. The direction in which ring gear 82 rotates may, for example, correspond with the direction in which axle assembly 10 is mounted.

For example, axle assembly 10 may be configured to be mounted to a corresponding vehicle in either a first configuration, e.g., in which differential carrier 42 faces a first direction relative to the vehicle, or a second configuration, e.g., in which differential carrier 42 faces a second direction relative to the vehicle. In the first configuration, ring gear 82 may rotate in the first direction, while in the second configuration, ring gear 82 may rotate in the second direction. In other embodiments, ring gear may be configured to rotate in only a single direction, either the first direction or the second direction.

Referring again to FIG. 3A, differential carrier 42 is illustrated along with bearing support wall 64. Bearing support wall 64 may extend outwardly away from a first side

502 of differential carrier 42 (e.g., in a direction away from central portion 50). Bearing support wall 64 may form a hollow stem-shape relative to differential carrier 42, wherein bearing support wall 64 is configured to receive drive pinon 84 (FIG. 2) as discussed above. Differential carrier 42 further includes mounting flange 62 to facilitate mounting of differential carrier 42 to electric motor module 26 (FIG. 2) as described above. Mounting flange 62 extends radially about axis 70 to form an outer edge portion 506 of differential carrier 42. Referring additionally to FIGS. 5B-5C, as discussed above, differential carrier includes bearing supports 60 on second side 504 of differential carrier 42 to be received within central portion 50 (FIG. 2) to facilitate support of differential assembly 22 (FIG. 2).

Figure 3A:
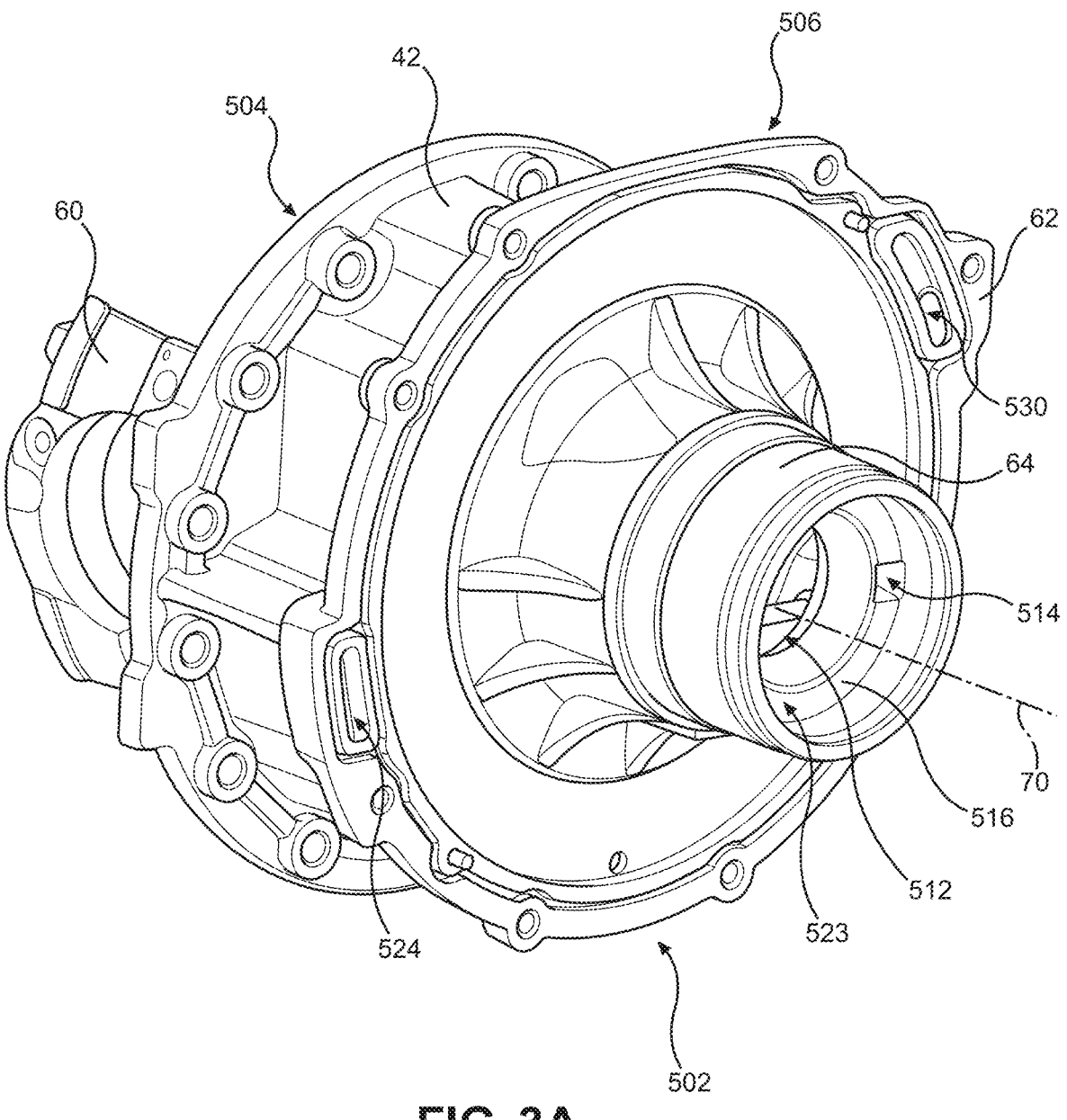
FIG. 3A is a first perspective view of a differential carrier that may be provided with the axle assembly of FIG. 1, including a bearing support wall.
Figure 3B:
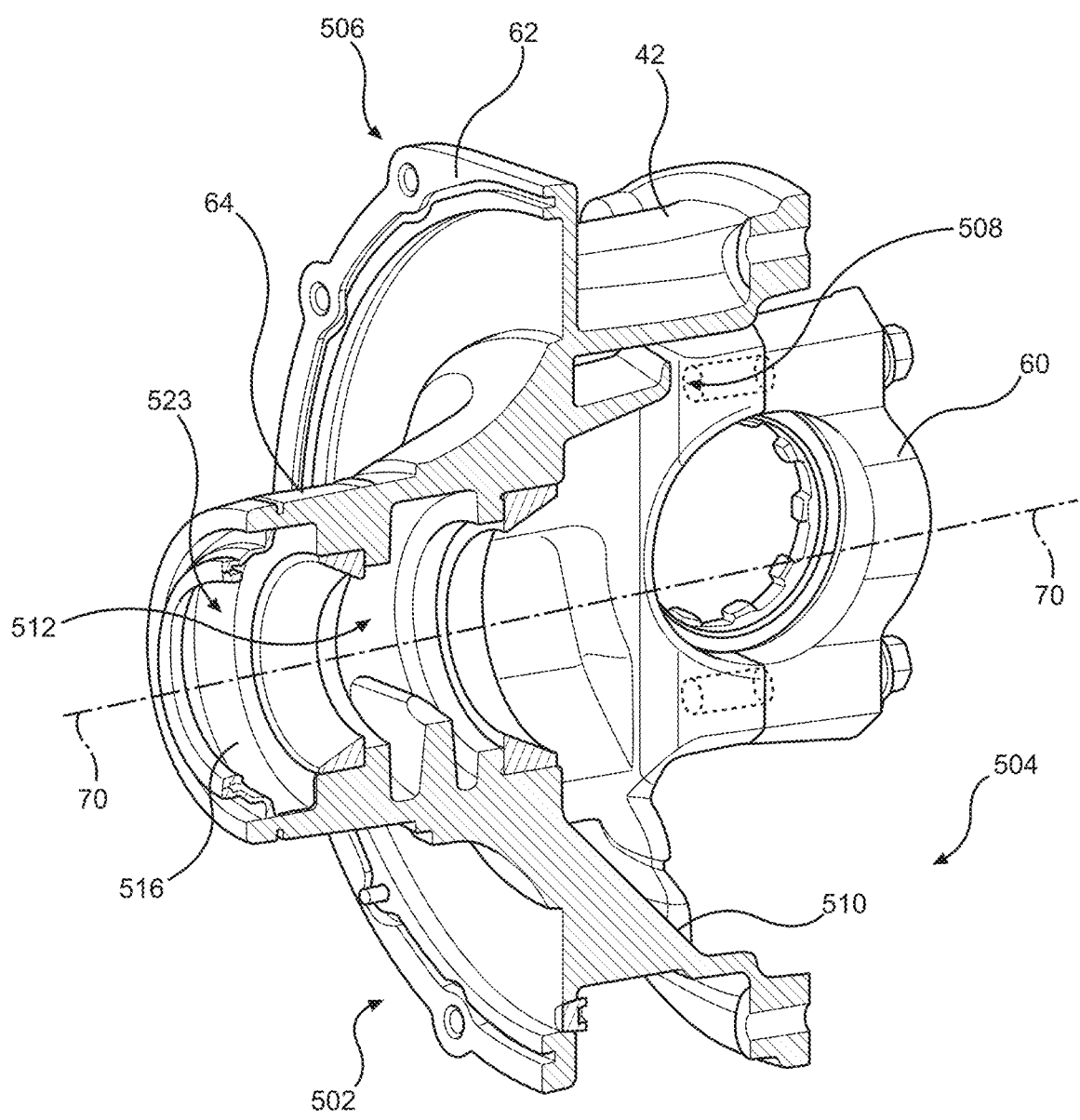
FIG. 3B is a longitudinal cross-section view of the differential carrier of FIG. 3A along axis 70 of FIG. 3A.
Figure 3C:
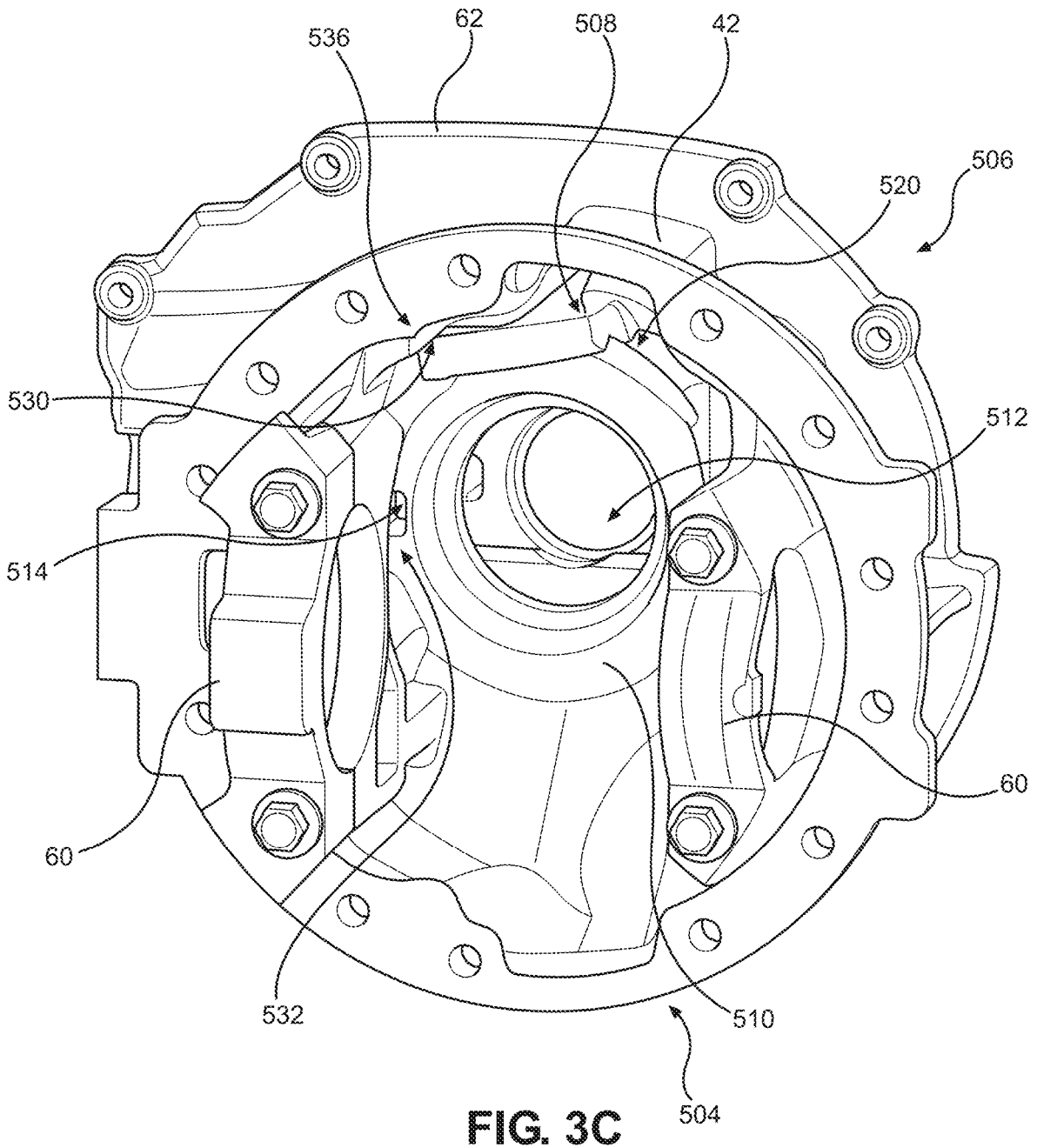
FIG. 3C is a second perspective view of the differential carrier of FIG. 3A, including an interior face of the differential carrier.
Figure 3D:
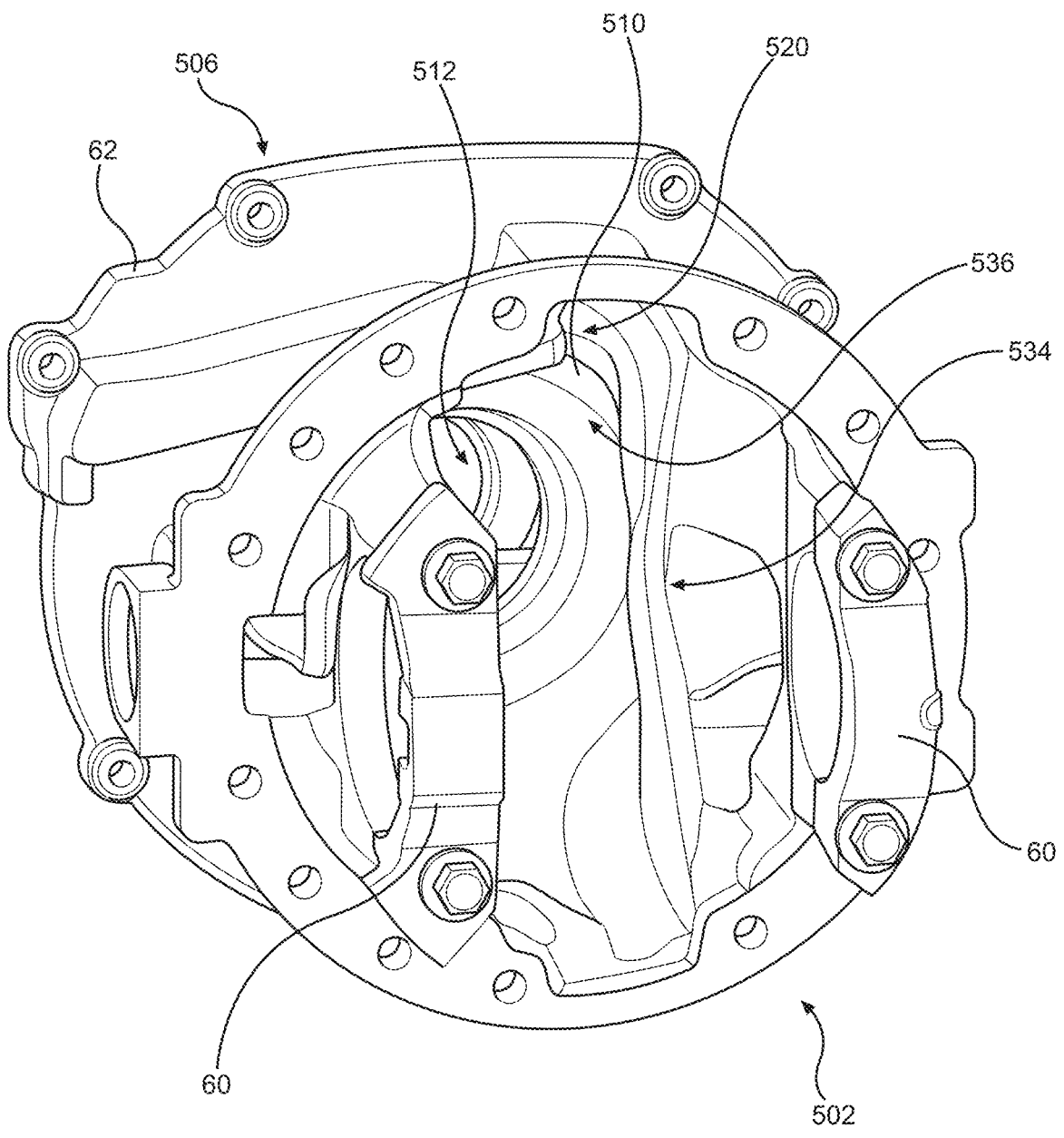
FIG. 3D is a third perspective view of the differential carrier of FIG. 3A, including another view of the interior face of the differential carrier.

Referring additionally to FIGS. 3B-3D, a top collector 508 may be defined within an interior face 510 of differential carrier 42, interior face 510 facing second side 504 of differential carrier 42. Top collector 508 is configured to receive lubricant when said lubricant is splashed by ring gear 82 (FIG. 2) during operation as discussed above. Top collector 508 may facilitate distribution of the lubricant to electric motor module 26 (FIG. 2) and pinion bearings as discussed further herein. A first feed opening 530 may be further defined within interior face 510 of differential carrier 42, which may be configured to receive lubricant when lubricant is splashed by ring gear 82 (FIG. 2) during operation as discussed above. In some embodiments, first feed opening 530 may correspond with a motor feed opening, for example, which may be configured to facilitate distribution of lubricant to electric motor module 26 (FIG. 2) as discussed further herein.

A second feed opening 520 may be further defined within interior face 510 of differential carrier 42, which is also configured to receive lubricant when said lubricant is splashed by ring gear 82 (FIG. 2) during operation as discussed above. In some embodiments, second feed opening 520 may correspond with a pinion feed opening, for example, which may be configured to facilitate distribution of said lubricant to pinion bearings as discussed further herein. While the embodiments discussed herein are described with reference to first feed opening 530 and second feed opening 520, other embodiments may include only a single feed opening or more than two feed openings as described further herein.

As illustrated, top collector 508, first feed opening 530, and second feed opening 520 may be positioned at a top section 536 of interior face 510. In other words, top collector opening 508, first feed opening 530, and second feed opening 520 may be positioned above hole 512 configured to receive drive pinion 84 (FIG. 2).

First feed opening 530 may extend from interior face 510 through mounting flange 62 to facilitate delivery of lubricant to electric motor module 26 (FIG. 2). For example, in some embodiments, first feed opening 530 within interior face 510 may receive lubricant from top collector 508 during operation of ring gear 82 (FIG. 2) and deliver said lubricant from first feed opening 530 within mounting flange 62 to a corresponding component of axle assembly 10, as described further herein.

A first side opening 514 may be defined within a first general side section 532 of interior face 510 of differential carrier 42 to a first side of hole 512 configured to receive drive pinion 84. For example, referring to top collector opening 508 and second feed opening 520 as being positioned at a general twelve o'clock position, first side opening 514 may be positioned relative to a general nine o'clock position when facing interior face 510. Such positional references should be considered as a general, rather than exact, position. First side opening 514 may extend axially from interior face 510 through bearing support wall 64, as shown in FIG. 3A. In some embodiments, first side opening 514 may be configured to receive lubricant from at least one of or both of a pinion bearing cavity (not shown) and a seal cavity 516 as described further herein and return said lubricant to sump portion 54 for recycling of the lubricant as described further herein.

A second side opening (not shown in FIGS. 3A-3D) may be defined within a second general side section 534 of interior face 510 of differential carrier 42 to a second side of hole 512 configured to receive drive pinon 84. For example, referring to top collector opening 508 and second feed opening 520 as being positioned at a general twelve o'clock position, the second side opening may be positioned relative to a general three o'clock position when facing interior face 510. Such positional references should be considered as a general, rather than exact, position. The second side opening may extend axially from interior face 510 through bearing support wall 64. In some embodiments, when ring gear 82 rotates in the first direction, the second side opening may be configured to receive lubricant from at least one of or both of an outer pinion bearing (not shown) and seal cavity 516 as described further herein and return said lubricant to sump portion 54 (FIG. 2) for recycling of the lubricant as described further herein. In some embodiments, when ring gear 82 rotates in the second direction, the second side opening may be configured to receive lubricant as it is being splashed by ring gear 82 (FIG. 2) as described above and deliver said lubricant to the pinion bearing cavity (not shown).

Now referring to FIGS. 3A-3D, seal cavity 516 may be defined by an interior surface 523 of bearing support wall 64. Seal cavity 516 may be an annular cavity configured to facilitate flow of the lubricant within seal cavity 516 and from seal cavity 516 into one of or both of first side opening 514 and the second side opening. Seal cavity 516 may be configured to receive lubricant from at least one of or both of the pinion bearing cavity (not shown) and outer pinion bearing (not shown) during operation. Additionally, motor drain passage opening 524 may be defined within mounting flange 62 to receive lubricant from electric motor module 26 and deliver said lubricant to sump portion 54 as discussed further herein.

While the positions of the top collector 508, first feed opening 530, second feed opening 520, first side opening 514, the second side opening, seal cavity 516, and motor drain 531 are described herein, said openings 508, 530, 520, 514, 516, 531, and the second side opening may be positioned in other various positions in other embodiments in such a manner to facilitate operation of axle assembly 10.

Figure 5A:
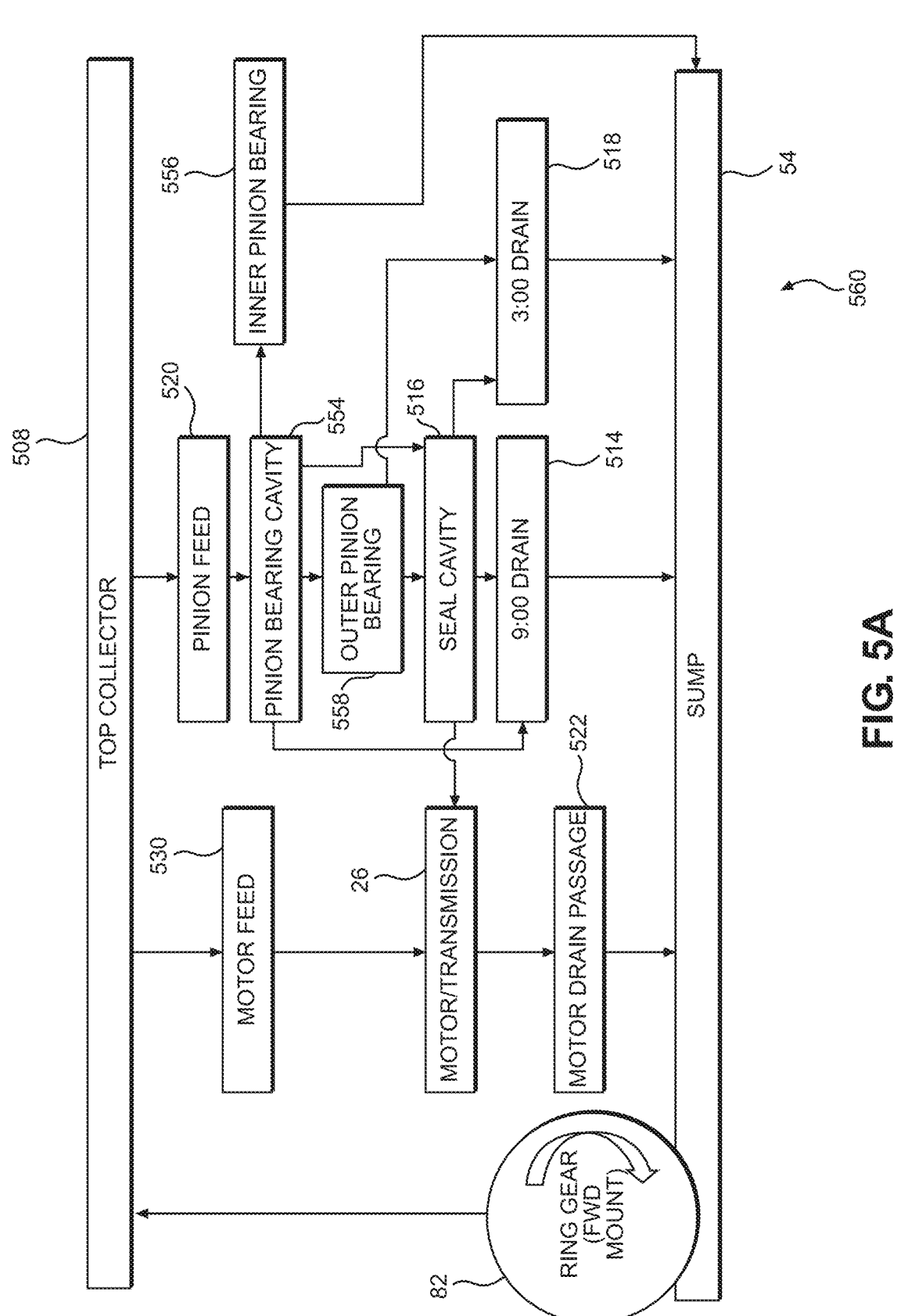
FIG. 5A is a flow chart illustrating a flow of lubricant during operation of the axle assembly in the forward mount configuration.
Figure 5B:
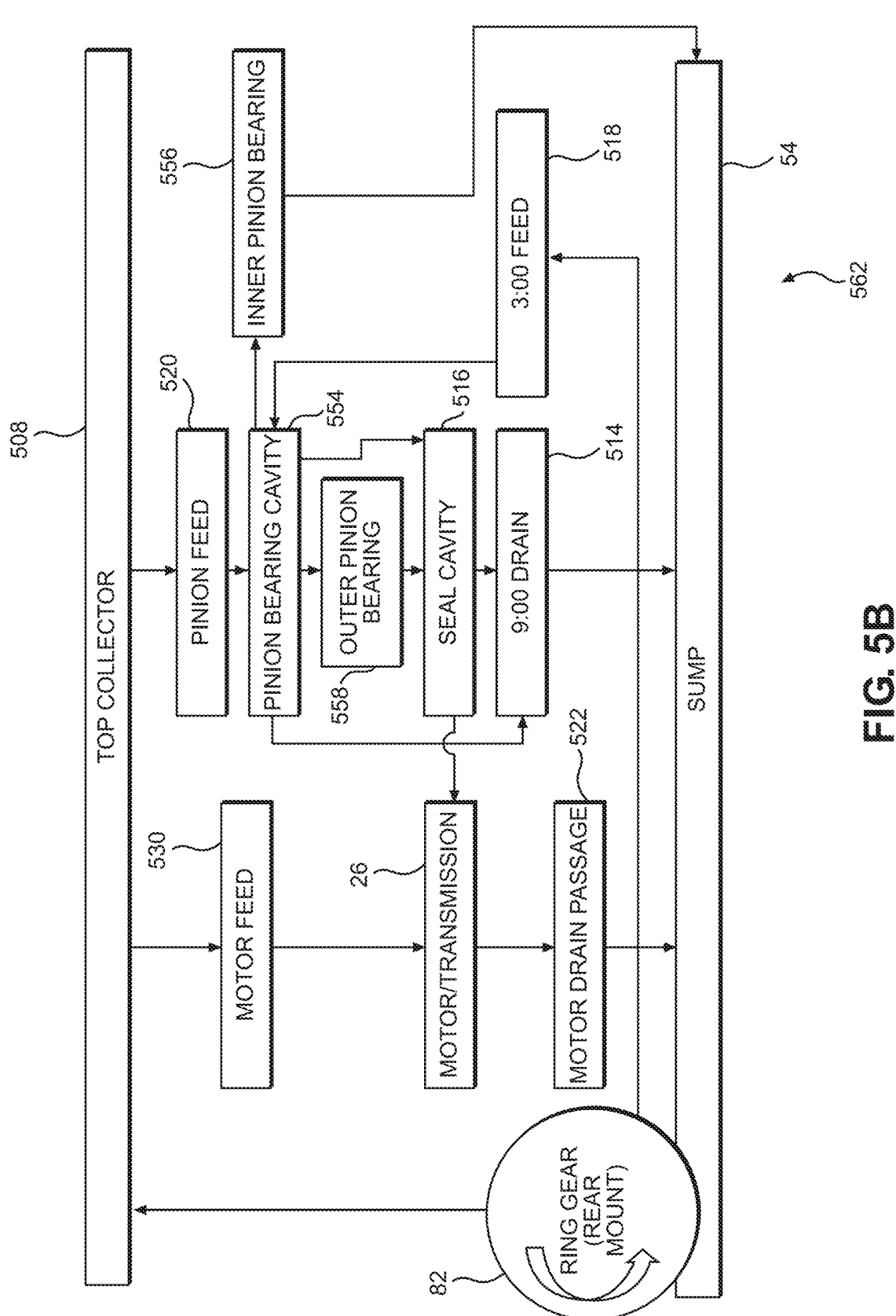
FIG. 5B is a flow chart illustrating a flow of lubricant during operation of the axle assembly in the rear mount configuration.

Now referring to FIG. 5A, an exemplary lubricant pathway 560 of axle assembly 10 when ring gear 82 rotates in the first direction is illustrated. For example, ring gear 82 rotates in the first direction to splash lubricant to top collector 508. The splashed lubricant may then flow from top collector 508 to first feed opening 530, e.g., a motor feed, and/or second feed opening 520, e.g., a pinion feed. From first feed opening 530, the lubricant may flow to electric motor module 26, via, for example, motor feed passage 522 (FIG. 4A). From electric motor module 26, the lubricant may flow to motor drain 531, and from motor drain 531, the lubricant may flow to sump portion 54 to be recycled during operation of the axle assembly.

From second feed opening 520, the lubricant may flow to a pinion bearing cavity 554. From pinion bearing cavity 554, the lubricant may flow to all, any one of, or any combination of an inner pinion bearing 556, an outer pinion bearing 558, seal cavity 516, and first side opening 514. Lubricant received by inner pinion bearing 556 may then flow to sump portion 54. Lubricant received by outer pinion bearing 558 may then flow to all or any one of seal cavity 516 and the second side opening (e.g., box 518). Lubricant received by seal cavity 516 may then flow to all, any one of, or any combination of first side opening 514, the second side opening (box 518), and electric motor module 26.

Lubricant received by either or both of first side opening 514 and the second side opening (box 518) may then flow to sump portion 54 for recycling of lubricant as discussed above. Exemplary lubricant pathway 560 is provided as an example pathway for lubricant in one or more embodiments for illustrative purposes. Other embodiments may include pathways that vary slightly or significantly from the lubricant pathway illustrated in FIG. 5A and/or described above. For example, in some embodiments, the guide structure as described herein may receive all or some of the lubricant without the lubricant being received by top collector 508.

Now referring to 5B, an exemplary lubricant pathway 562 of axle assembly 10 when ring gear 82 rotates in the second direction is illustrated. For example, ring gear 82 rotates in a second direction opposite the first direction to splash lubricant to all or one of top collector 508 or the second side opening (e.g., box 518). Lubricant received by top collector 508 may flow to first feed opening 530, e.g., motor feed, and/or second feed opening 520, e.g., pinion feed.

From first feed opening 530, the lubricant may flow to electric motor module 26, via, for example, passage 522 (FIG. 4A). From electric motor module 26, the lubricant may flow to motor drain 531, and from motor drain 531, the lubricant may flow to sump portion 54 to be recycled during operation of axle assembly 510.

Lubricant received by second feed opening 520 may flow to pinion bearing cavity, and lubricant received by the second side opening (box 518) may flow to pinion bearing cavity 554. Lubricant received by pinion bearing cavity 554 may flow to all, any one of, or any combination of inner pinion bearing 556, seal cavity 516, outer pinion bearing 558, and first side opening 514. Lubricant received by outer pinion bearing 558 may flow to seal cavity 516.

Lubricant received by seal cavity 516 may flow to both or one of first side opening 514 and electric motor module 26. Lubricant received by first side opening 514 may flow to sump portion 54 for recycling of lubricant as discussed above. Exemplary lubricant pathway 562 is provided as an example pathway for lubricant in one or more embodiments for illustrative purposes. Other embodiments may include pathways that vary slightly or significantly from the lubricant pathway illustrated in FIG. 5B and/or described above. For example, in some embodiments, the guide structure as described herein may receive all or some of the lubricant without the lubricant being received by top collector 508.

Now referring to FIGS. 6A-6D, a differential carrier 42' is illustrated. Differential carrier 42' includes the same components and is subject to the same description provided above in relation to differential carrier 42 except as discussed further herein. For example, differential carrier 42' includes top collector 508, second feed opening 520, first feed opening 530, and other components, openings, and passageways described above in relation to differential carrier 42.

Differential carrier 42' includes a guide structure 540 positioned within top section 536 of interior face 510 of differential carrier 42'. Guide structure 540 is configured to guide lubricant during operation of ring gear 82 (FIG. 2) to second feed opening 520 and first feed opening 530 to ensure adequate supply of lubricant to the components of axle assembly 10 as discussed further herein. For example, lubricant may be collected within top collector 508 and/or otherwise trapped, collected, and/or directed by guide(s) of guide structure 540 as the lubricant is splashed or swells toward interior face 510 of differential carrier 42' as discussed further herein.

As shown, top collector 508 is defined as the space longitudinally above guide structure 540 within top section 536 of differential carrier 42'. Top collector 508 may include a ceiling surface 509 that is spaced apart from guide structure 540 and its components to facilitate reception of lubricant as described further herein.

Guide structure 540 may include a plurality of guides 542, such as, for example, first guide 542a, second guide 542b, and third guide 542c. Each guide 542 protrudes axially from interior face 510 of differential carrier 42' so that each guide is configured to receive lubricant flow and direct said lubricant flow to the corresponding second feed opening 520 and/or first feed opening 530.

First guide 542a may extend from first general side section 532 of interior face 510 laterally toward second general side section 534 of interior face 510. As shown, first guide 542a may extend in an upward direction away from hole 512 for receiving drive pinion 84 (FIG. 2), so that a central portion 548a of first guide 542a forms an upward slope from a first end 544a of first guide 542a to a second end 546a of first guide 542a and a downward slope from second end 546a of first guide 542a to first end 544a of first guide 542a. First feed opening 530 may be positioned adjacent to first end 544a of first guide 542a, so that lubricant received by an upper surface 541 of first guide 542a may flow along the downward slope between second end 546a and first end 544a and delivered to first feed opening 530 as described further herein.

Alternatively, lubricant received by a lower surface 539 of first guide 542a may flow into sump portion 54 (FIG. 2).

Second guide 542b may extend from second end 546a of first guide 542a further toward second general side section 534 of interior face 510 and define a bell curve wherein first second guide 542b curves upward away from hole 512 as it extends from first guide 542a and then curves downward. In other words, a first end 544b of second guide 542b may be positioned adjacent to and/or touching second end 546a of first guide 542a.

For example, in the illustrated embodiment, first end 544b of second guide 542b may sit on top of and touching second end 546a of first guide 542a. In other embodiments, first end 544b of second guide 542b may be positioned longitudinally above second end 546a of first guide 542a, but first end 544b and second end 546a may be spaced apart from each other. In yet other embodiments, other positional arrangements of first end 544b of second guide 542b and second end 546a of first guide 542a are possible to facilitate guidance of lubrication as discussed further herein.

A second end 546b may be positioned longitudinally below first end 544b of second guide 542b and laterally nearer to second general side section 534 of interior face 510 relative to first end 544b of second guide 542b with a central portion 548b of second guide 542b forming a curve between first end 544b and second end 546b as described above.

Second feed opening 520 may be positioned just below and near first end 544b of second guide 542b so that lubricant received by a lower surface 543 of second guide 542b may flow along a peak 545 of the bell curve between first end 544b and second end 546b and be delivered to second feed opening 520 as described further herein. In other words, second feed opening 520 may be positioned adjacent to first end 544b of second guide 542b.

Alternatively, lubricant received by lower surface 543 of second guide 542b may flow along peak 545 of the bell curve between first end 544b and second end 546b to be reintroduced to sump portion 54 (FIG. 2). The determination of whether lubricant flows to second feed opening 520 or sump portion 54 (FIG. 2) may be dependent on where along lower surface 543 the lubricant is received.

For example, if the lubricant is received on the side of peak 545 nearest to second general side section 534, the lubricant may be more likely to flow to sump portion 54 (FIG. 2). If the lubricant is received on the side of peak 545 nearest to first general side section 532, the lubricant may be more likely to flow to second feed opening 520.

Lubricant received by an upper surface 547 of second guide 542b may flow along peak 545 of the bell curve between first end 544b and second end 546b and be delivered to first guide 542a and to first feed opening 530 as described above. Alternatively, lubricant received by upper surface 547 of second guide 542b may flow along peak 545 of the bell curve between first end 544b and second end 546b to be reintroduced to sump portion 54 (FIG. 2). The determination of the direction of lubricant flow may be dependent on where along upper surface 547 the lubricant is received, as discussed above.

As shown, in some embodiments, second guide 542b may extend axially further than first guide 542b so that an edge 550b of second guide 542b extends beyond an edge 550a of first guide 542a. For example, second guide 542b may, in some embodiments, include a protrusion 537 which extends at least a partial length of second guide 542b and extends axially further than a main body 535 of second guide 542b to facilitate flow of the lubricant.

In other embodiments, first guide 542a and second guide 542b extend the same distance axially, relative to each other. In other words, in some embodiments, edge 550a and edge 550b may be the same axial distance from interior face 510. In yet other embodiments, first guide 542a may extend axially further than second guide 542b so that edge 550a extends beyond edge 550b.

Third guide 542c may extend from second end 546a of first guide 542a further toward second general side section 534 and curve downward, i.e., toward pinon feed opening 520. In other words, first end 544c of third guide 542c may be positioned adjacent to and/or touching second end 546a of first guide 542a. For example, in the illustrated embodiment, first end 544c of third guide 542c may be touching a lower portion of 546a of first guide 542a. In some embodiments, first end 544c of third guide 542c may be positioned adjacent to second end 546a of first guide 542c, but first end 544c and second end 546a may be spaced apart from each other. In yet other embodiments, other positional arrangements of first end 544c of third guide 542c and second end 546a of first guide 542a are possible to facilitate guidance of lubrication as discussed further herein.

A second end 546c may be positioned longitudinally below first end 544c of third guide 542c and laterally nearer to second general side section 534 of interior face 510 relative to first end 544c of third guide 542c with a central portion 548c of third guide 542c forming a curve between first end 544c and second end 546c. Second feed opening 520 may be adjacent to first end 544c of second guide 542c so that any lubricant received by third guide 542c may flow along the curve between first end 544c and second end 546c and be delivered to one of second feed opening 520 as described further herein and sump portion 54 (FIG. 2).

As illustrated, third guide 542c is similar in shape and route to second guide 542b, where third guide 542c is positioned longitudinally under second guide 542b in such a manner as to define a gap 552 between second guide 542b and third guide 542c. In other embodiments, third guide 542c and second guide 542b may include various differences not illustrated which facilitate guidance of lubrication as discussed further herein.

As shown, in some embodiments, first guide 542a and second guide 542b may both extend further axially than third guide 542c so that edges 550a, 550b extends beyond an edge 550c of third guide 542c. In other embodiments, first guide 542a, second guide 542b, and third guide 542c extend the same distance axially, relative to each other. In other words, in some embodiments, edge 550a, edge 550b, and edge 550c may be the same axial distance from interior face 510. In yet other embodiments, any one of first guide 542a, second guide 542b, and third guide 542c may extend the furthest axially from interior face 510, may extend axially greater than at least one of the other guides 542, may extend axially lesser than at least one of the other guides 542, or may extend axially the least of guides 542.

Figure 6A:
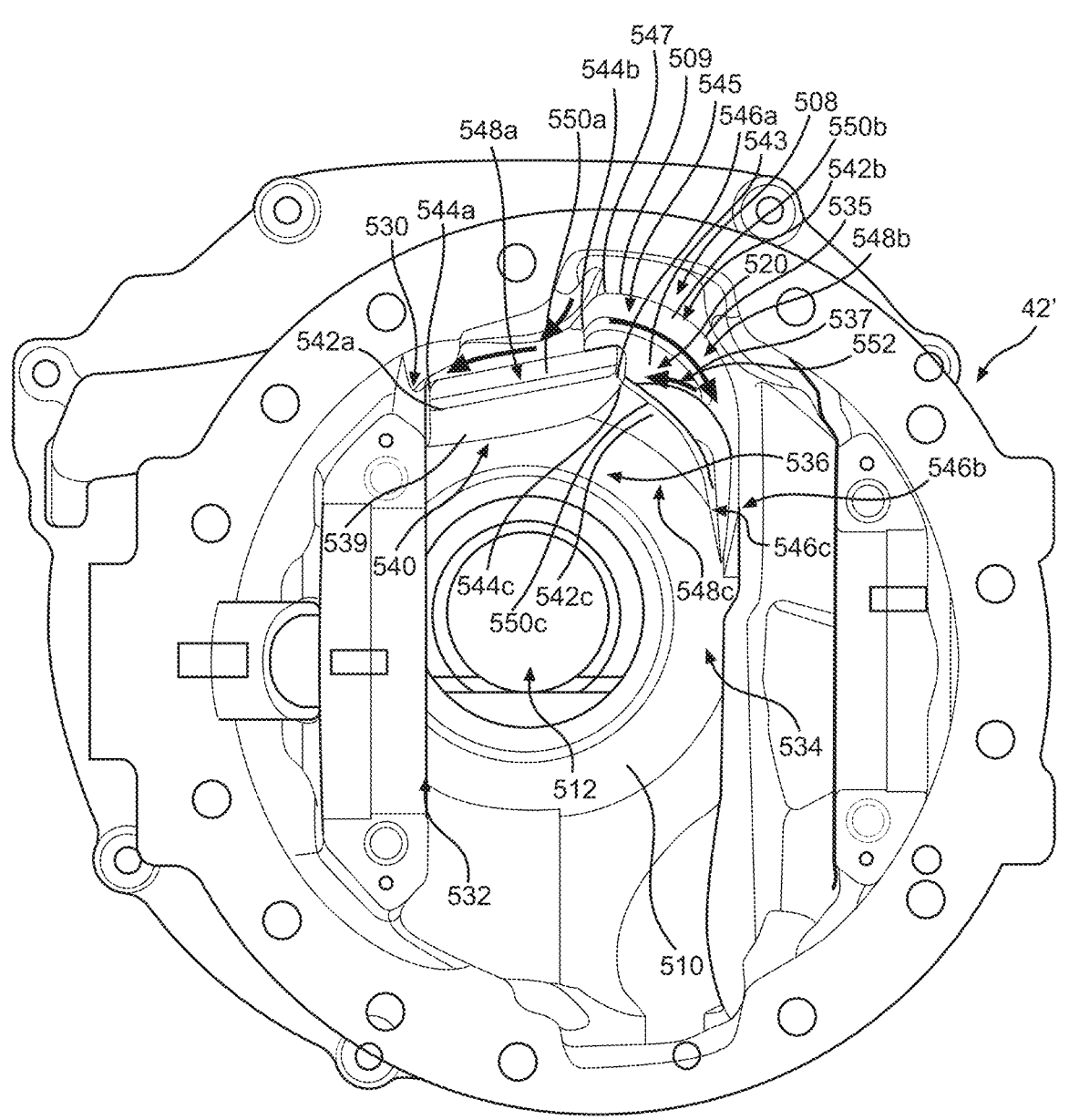
FIG. 6A is a view of an interior face of a differential carrier for use with the axle assembly of FIG. 1, including a guide structure illustrating a flow of lubricant during rotation of a ring gear of the axle assembly in a first direction.

Now referring to FIG. 6A, lubricant flow within differential carrier 42' when ring gear 82 rotates in the first direction is illustrated. During operation of axle assembly 10, in a first configuration, ring gear 82 (FIG. 2) rotates in the first direction and carries lubricant 56 (FIG. 2) from sump portion 54 (FIG. 2) to the top of ring gear 82, where it is then flung toward interior face 510 of differential carrier 42'. The flung lubricant may be received by top collector 508, gap 552, and/or any of guides 542; lubricant received by top collector 508 and/or gap 552 may then be received by corresponding guide 542.

For example, lubricant received by top collector 508 may be received by first guide 542a or second guide 542b, while lubricant received by gap 552 may be received by third guide 542c. Lubricant received by first guide 542a and/or second guide 542b may flow along said first guide 542a and/or second guide 542b to be received by first feed opening 530. Lubricant received by second guide 542b and/or third guide 542c may flow along said second guide 542b and/or third guide 542c to be received by second feed opening 520. Lubricant received by any of first guide 542a, second guide 542b, and/or third guide 542c may flow back into sump portion 54 (FIG. 2).

Figure 6B:
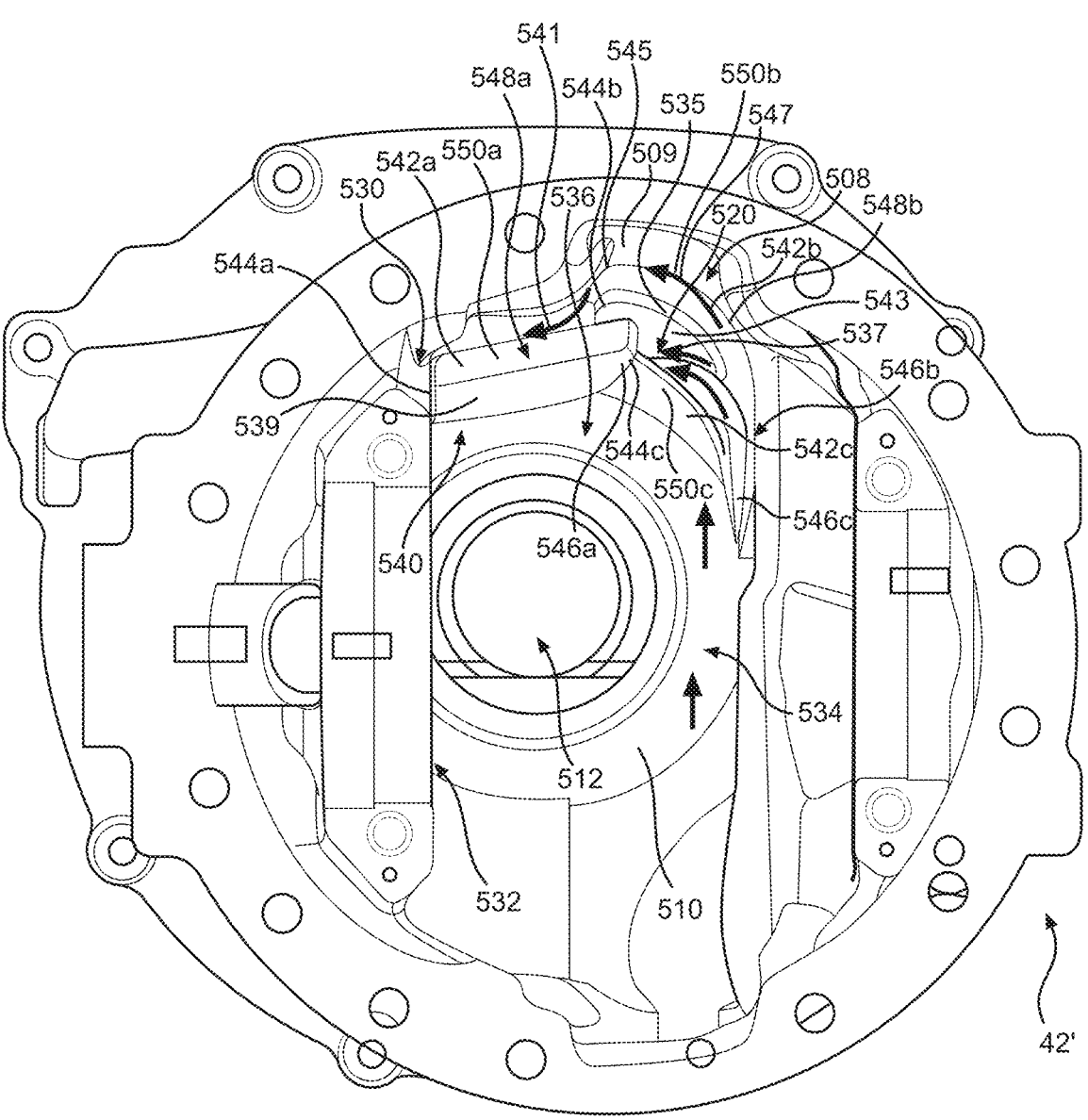
FIG. 6B is a view of an interior face of the differential carrier of FIG. 6A, illustrating a flow of lubricant during rotation of the ring gear of the axle assembly in a second direction.
Figures 6C, 6D:
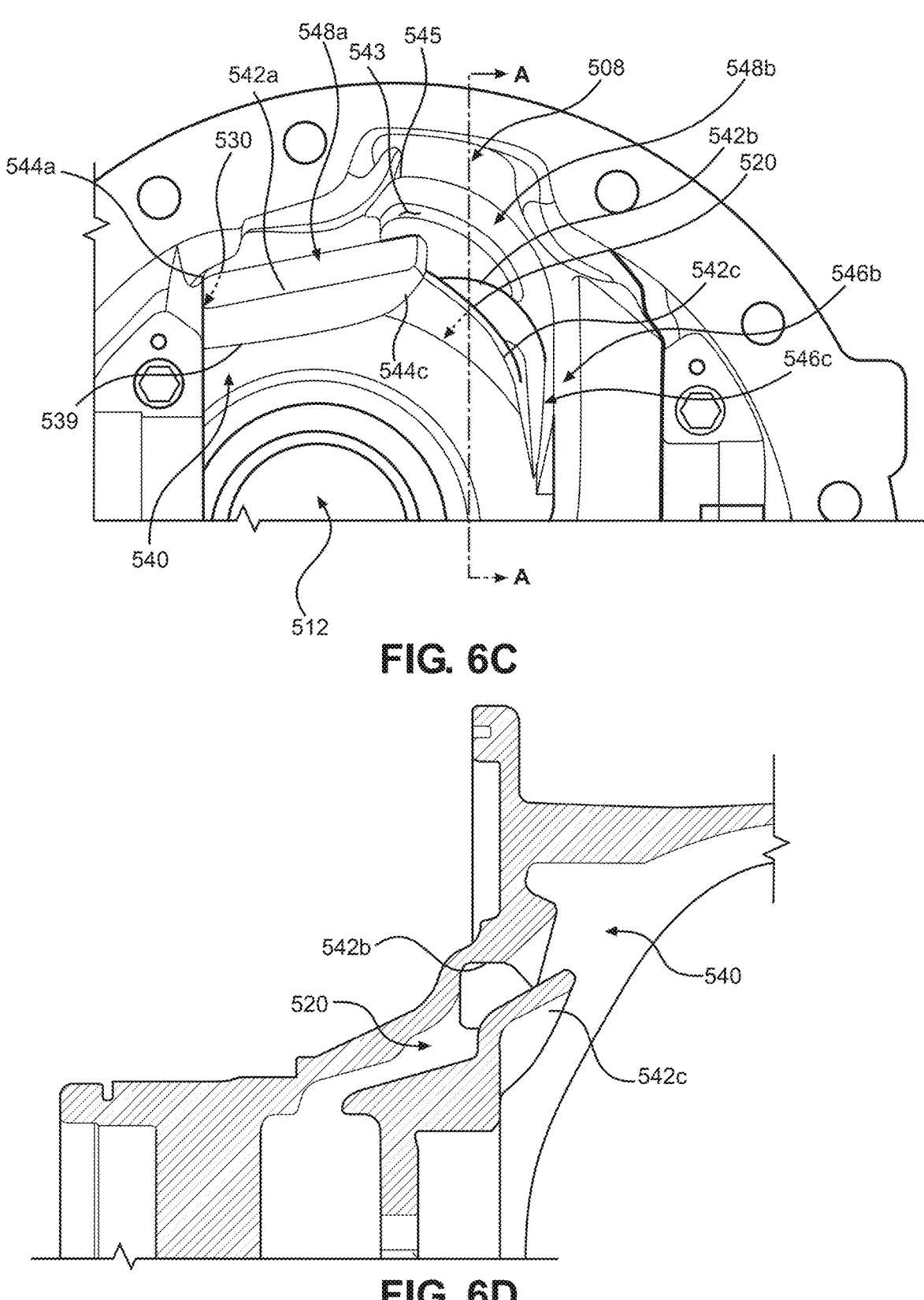
FIG. 6C is a close-up view of the guide structure of FIG. 6A.
FIG. 6D is a partial cross-section of the guide structure of FIG. 6C, taken along line A-A.

Referring to FIG. 6B, lubricant flow within differential carrier 42' when ring gear 82 rotates in the second direction is illustrated. During operation of axle assembly 10, in a second configuration, ring gear 82 (FIG. 2) rotates in a second direction, opposite the first direction discussed above, and carries lubricant from sump portion 54 in such a manner causing an upward swell of lubricant and/or flinging up lubricant toward interior face 510 of differential carrier 42'. The lubricant may be received by top collector 508, gap 552, and/or any of guides 542; lubricant received by top collector 508 and/or gap 552 may then be received by corresponding guide 542.

For example, lubricant received by top collector 508 may be received by first guide 542a or second guide 542b, while lubricant received by gap 552 may be received by third guide 542c. Lubricant received by first guide 542a and/or second guide 542b may flow along said first guide 542a and/or second guide 542b to be received by first feed opening 530. Lubricant received by second guide 542b and/or third guide 542c may flow along said second guide

542b and/or third guide 542c to be received by second feed opening 520. Lubricant received by any of first guide 542a, second guide 542b, and/or third guide 542c may flow back into sump portion 54 (FIG. 2).

In some embodiments, guide structure 540 may be cast mold directly onto interior face 510. In other words, in some embodiments, guide structure 540 may be integrated with and/or formed via one piece construction with differential carrier 42'. Such construction circumvents the necessity of installing a secondary accessory and/or separate piece onto differential carrier 42' to experience advantages provided by guide structure 540.

In other embodiments, guide structure 540 may be a separate piece fixedly coupled to interior face 510. For example, guide structure 540 may be attached to interior face 510 using a permanent or semi-permanent adhesive, welding, or other permanent or semi-permanent attachment. In yet other embodiments, guide structure 540 may be attached to interior face 510 using other attachment methods, such as mechanical fasteners, friction fit, mating surfaces, and/or other attachment methods as known in the art.

Figure 7A:
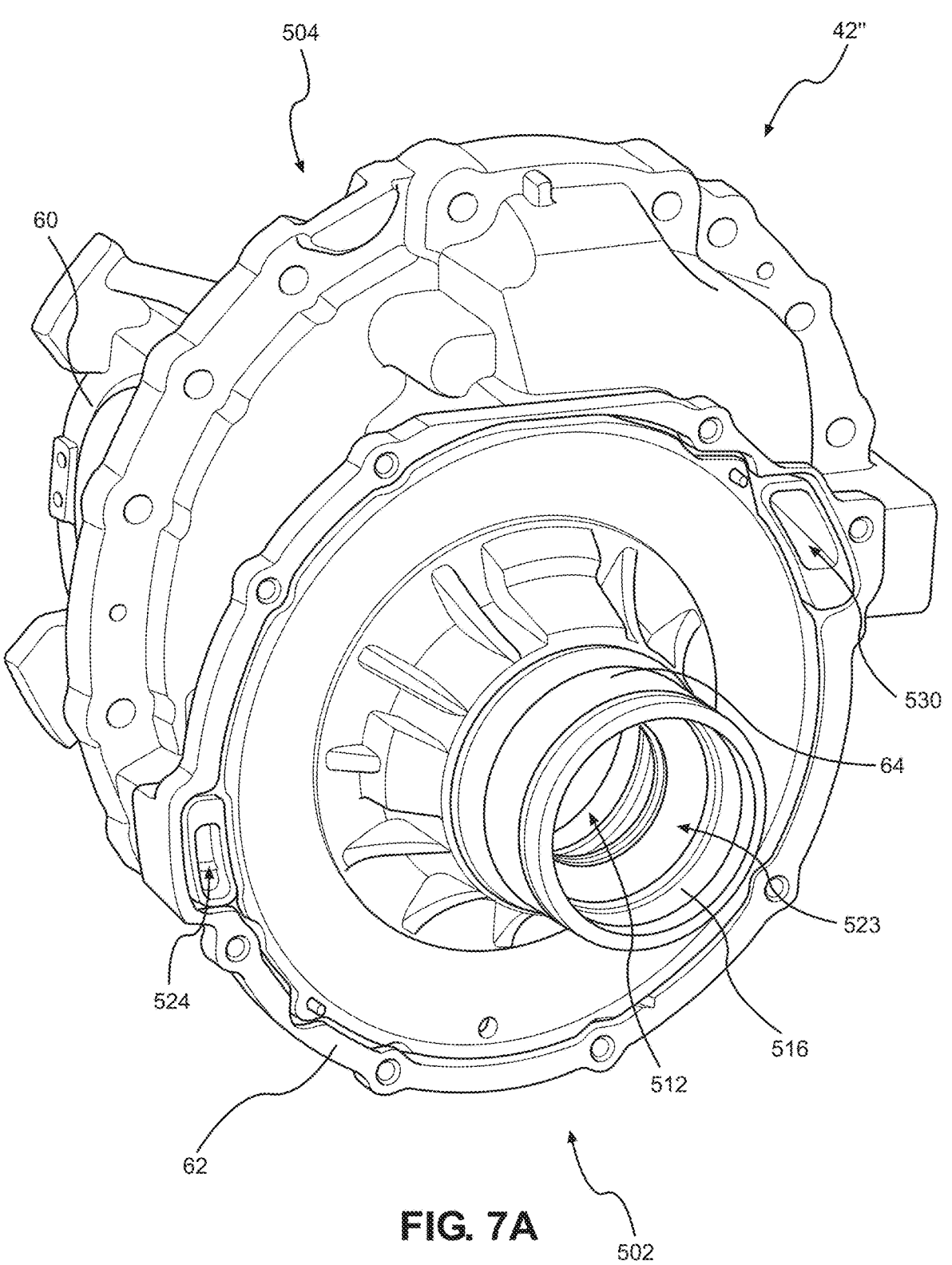
FIG. 7A is a perspective view of a differential carrier for use with the axle assembly of FIG. 1.
Figure 7B:
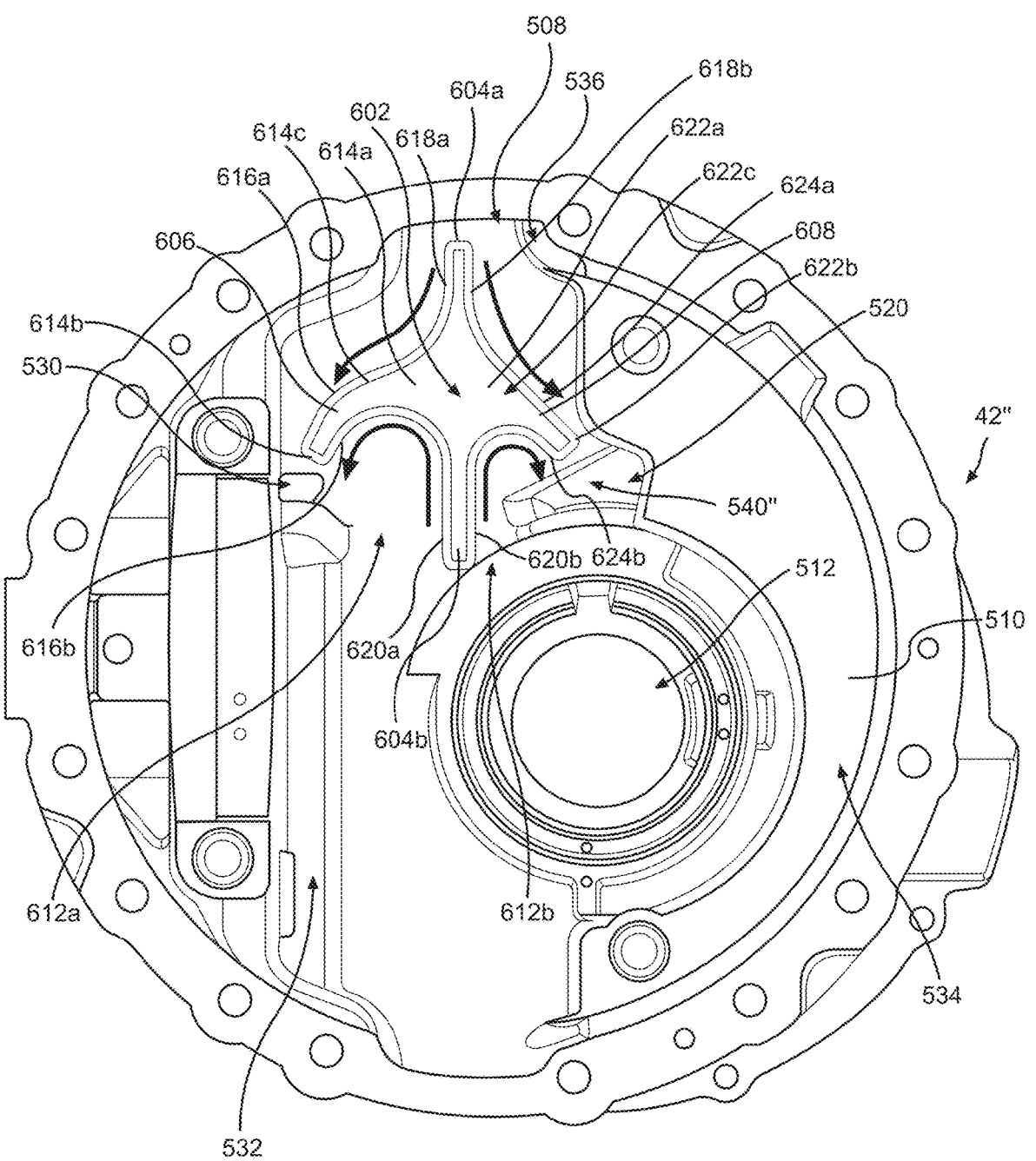
FIG. 7B is a view of an interior face of the differential carrier of FIG. 7A, including a guide structure illustrating a flow of lubricant during operation of a ring gear in either a first direction or a second direction.

Now referring to FIGS. 7A-7B, a differential carrier 42'' is illustrated. Differential carrier 42'' includes the same components and is subject to the same description provided above in relation to differential carrier 42 or 42' except as discussed further herein. For example, differential carrier 42'' includes top collector 508, second feed opening 520, first feed opening 530, and other components, openings, and passageways described above in relation to differential carrier 42.

Differential carrier 42'' includes a guide structure 540'' positioned within top section 536 of interior face 510 of differential carrier 42'' Guide structure 540 may be configured to guide lubricant collected by top collector 508 during operation of ring gear 82 (FIG. 2) to second feed opening 520 and first feed opening 530 to ensure adequate supply of lubricant to components of axle assembly 10 as discussed further herein.

Guide structure 540'' may include a central portion 602, a bifurcating guide 604 having an upper bifurcating guide portion 604a and a lower bifurcating guide portion 604b, a first guide leg 606, and a second guide leg 608. As shown, top collector 508 is defined as the space longitudinally above guide structure 540'' within top section 536 of differential carrier 42'', as well as the spaces above first guide leg 606 and second guide leg 608. Upper bifurcating guide portion 604a, lower bifurcating guide portion 604b, first guide leg 606, and second guide leg 608 may all extend from a central portion 602 of guide structure 540''.

Bifurcating guide 604 generally divides guide structure 540'' into a first side 612a of guide structure 540'' and a second side 612b of guide structure 540''. In some embodiments, one of first side 612a and second side 612b may be larger than the other of first side 612a and second side 612b. In other embodiments, first side 612a and second side 612b may be generally the same size. Upper bifurcating guide portion 604a may extend in a general upward direction from central portion 602, while lower bifurcation guide portion 604b may extend in a general downward direction from central portion 602.

As illustrated, upper bifurcating guide portion 604a and lower bifurcating guide portion 604b may be vertically aligned. In other embodiments, upper bifurcation guide portion 604a and lower bifurcating guide portion 604b may be offset relative to each other. In some embodiments, such as that illustrated in FIG. 7B, upper bifurcating guide portion 604a may have a length that is relatively shorter than a length of lower bifurcating guide portion 604*b*. In other embodiments, upper bifurcating guide portion 604*a* and lower bifurcating guide 604*b* may each define a length that is generally equal relative to the other. In yet other embodiments, upper bifurcating guide portion 604*a* may have a length that is relatively longer than a length of lower bifurcating guide portion 604*b*.

First feed opening 530 may be located on the first side 612*a* of guide structure 540″, while second feed opening 520 may be located on the second side 612*b* of guide structure 540″. First guide leg 606 may extend from central portion 602 toward first general side section 532 of interior face 510 and first feed opening 530.

As illustrated, a first end 614*a* of first guide leg 606 may be integrated with central portion 602 of guide structure 540″ and a second end 614*b* of first guide leg 606 may be positioned relatively lower and further toward first general side section 532 relative to first end 614*a*. Second end 614*b* may be positioned adjacent to first feed opening 530 to encourage flow of lubricant to first feed opening 530 as discussed further herein.

First guide leg 606 may form an upper guide surface 616*a* facing toward top section 536 of interior face 510 of differential carrier 42″. A first guide surface 618*a* of upper bifurcation guide portion 604*a* may form a confluent surface with upper guide surface 616*a* of first guide leg 606 to encourage flow of lubricant from a top collector 508 to first feed opening 530 as described further herein.

As illustrated, upper guide surface 616*a* may define a curved surface. In other words, a central portion 614*c* of first guide leg 606 may be defined between first end 614*a* and second end 614*b*, where a slope of upper guide surface 616*a* between first end 614*a* and central portion 614*c* is less than a slope of upper guide surface 616*a* between central portion 614*c* and second end 614*b*. Other embodiments may include a different shape of upper guide surface 616*a* to encourage flow of lubricant as described further herein.

First guide leg 606 may form a lower guide surface 616*b* facing away from top section 536 of differential carrier 42″. A first guide surface 620*a* of lower bifurcation guide portion 604*b* may form a confluent surface with lower guide surface 616*b* of first guide leg 606 to encourage flow of lubricant to first feed opening 530 as described further herein.

As illustrated, lower guide surface 616*b* may define a curved surface. In other words, the point of lower guide surface 616*b* corresponding with central portion 614*c* may be higher relative to both second end 614*b* and the meeting point of lower guide surface 616*b* and first guide surface 620*a* of lower bifurcation guide 604*b*. Other embodiments may include a different shape of lower guide surface 616*b* to encourage flow of lubricant as described further herein.

Second guide leg 608 may extend from central portion 610 toward second general side section 534 of interior face 510 and second feed opening 520. As illustrated, a first end 622*a* of second guide leg 608 may be integrated with central portion 610 of guide structure 540″ and a second end 622*b* of second guide leg 608 may be positioned relatively lower and further toward second general side section 534 relative to first end 622*a*. Second end 622*b* may be positioned adjacent to second feed opening 520 to encourage flow of lubricant to second feed opening 520 as discussed further herein.

Second guide leg 608 may form an upper guide surface 624*a* facing toward top section 536 of interior face 510 of differential carrier 42″. A second guide surface 618*b* of upper bifurcation guide portion 604*a* may form a confluent surface with upper guide surface 624*a* of second guide leg

608 to encourage flow of lubricant from top collector 508 to second feed opening 520 as described further herein.

As illustrated, upper guide surface 624*a* may define a sloped surface so that upper guide surface 624 forms an upward slope from second end 622*a* toward first end 622*b* and a downward slope from first end 622*b* toward second end 622*a* to encourage flow of lubricant along upper guide surface 624*a* toward second feed opening 520. Other embodiments may include a different shape of upper guide surface 624*a* to encourage flow of lubricant as described further herein.

Second guide leg 608 may form a lower guide surface 624*b* facing away from top section 536 of interior face 510 of differential carrier 42″. A second guide surface 620*b* of lower bifurcation guide portion 604*b* may form a confluent surface with lower guide surface 624*b* of second guide leg 608 to encourage flow of lubricant to second feed opening 520 as described further herein.

As illustrated, lower guide surface 624*b* may define a curved surface. In other words, the point of lower guide surface 624*b* corresponding with a central portion 622*c* may be higher relative to both second end 622*b* and meeting point of lower guide surface 614*b* and second guide surface 620*b* of lower bifurcation guide 604*b*. Other embodiments may include a different shape of lower guide surface 624*b* to encourage flow of lubricant as described further herein.

Still referring to FIG. 7B, lubricant flow within differential carrier 42″ when ring gear 82 rotates in the first direction is illustrated. During operation of axle assembly 10, in the first configuration, ring gear 82 (FIG. 2) rotates in the first direction and carries lubricant 56 (FIG. 2) from sump portion 54 (FIG. 2) to the top of ring gear 82, where it is then flung toward interior face 510 of differential carrier 42′. The flung lubricant may be received by top collector 508, either guide surface 618 of upper bifurcation portion 604*a*, upper guide surface 616*a* of first guide leg 606, and/or upper guide surface 624*a* of second guide leg 608.

Lubricant received by guide surface 618*a* may flow along guide surface 618*a* to upper guide surface 616*a* of first guide leg 606 to be received by first feed opening 530; lubricant received by upper guide surface 616*a* of first guide leg 606 may similarly flow along upper guide surface 616*a* to first feed opening 530. Lubricant received by guide surface 618*b* may flow along guide surface 618*b* to upper guide surface 624*a* of second guide leg 608 to be received by second feed opening 520; lubricant received by upper guide surface 624*a* of second leg 608 may similarly flow along upper guide surface 624*a* to second feed opening 520. Lubricant received by any of guide surface 618*a*, upper guide surface 616*a*, guide surface 618*b*, and/or upper guide surface 624*a* may also or alternatively flow into sump portion 54 (FIG. 2).

Lubricant flow within differential carrier 42″ when ring gear 82 rotates in the second direction is also illustrated in FIG. 7B. During operation of axle assembly 10, in the second configuration, ring gear 82 (FIG. 2) rotates in the second direction, opposite the first direction discussed above, and carries lubricant from sump portion 54 in such a manner causing an upward swell and/or upward flinging of lubricant toward interior face 510 of differential carrier 42″. The flung lubricant may be received by top collector 508, either guide surface 618 of upper bifurcation portion 604*a*, upper guide surface 616*a* of first guide leg 606, and/or upper guide surface 624*a* of second guide leg 608 as described above. Additionally, lubricant may be received by first guide surface 620*a* or second guide surface 620*b* of lower bifurcation guide portion 604b, lower guide surface 616b of first guide leg 606, and/or lower guide surface 624b of second guide leg 608.

The force of the lubricant, resultant from the flinging motion of ring gear 82, may allow the lubricant to flow along the guide surfaces to the corresponding feed opening. For example, lubricant received by guide surface 620a may flow along guide surface 620a to lower guide surface 616b of first guide leg 606 to be received by first feed opening 530; lubricant received by lower guide surface 616b of first guide leg 606 may similarly flow along lower guide surface 616b to first feed opening 530.

Lubricant received by guide surface 620b may flow along guide surface 620b to lower guide surface 624b of second guide leg 608 to be received by second feed opening 520; lubricant received by lower guide surface 624b of second guide leg 608 may similarly flow along lower guide surface 624b of second guide leg 608 to be received by second feed opening 520. Lubricant received by any of guide surface 618, upper guide surface 616a, upper guide surface 624a, first guide surface 620a, second guide surface 620b, lower guide surface 616b, and/or lower guide surface 624b may also or alternatively flow into sump portion 54 (FIG. 2).

In some embodiments, guide structure 540" may be cast mold directly onto interior face 510. In other words, in some embodiments, guide structure 540" may be integrated with and/or formed via one piece construction with differential carrier 42". Such construction circumvents the necessity of installing a secondary accessory and/or separate piece onto differential carrier 42" to experience advantages provided by guide structure 540".

In other embodiments, guide structure 540" may be a separate piece fixedly coupled to interior face 510. For example, guide structure 540" may be attached to interior face 510 using a permanent or semi-permanent adhesive, welding, or other permanent or semi-permanent attachment. In yet other embodiments, guide structure 540" may be attached to interior face 510 using other attachment methods, such as mechanical fasteners, friction fit, mating surfaces, and/or other attachment methods as known in the art.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A differential carrier, comprising:
a housing defining a central opening and an interior face surrounding the central opening;
a first feed opening defined by the housing within the interior face;
a second feed opening defined by the housing within the interior face; and
a guide structure fixedly attached to the interior face, the guide structure including a central portion, a first guide extending from the central portion away from the central opening, a second guide extending from the central portion toward the central opening, a third guide extending laterally from the central portion in a first direction, and a fourth guide extending laterally from the central portion in a second direction.

2. The differential carrier of claim 1, wherein the first guide and the second guide are longitudinally aligned relative to the central portion.

3. The differential carrier of claim 1, wherein the third guide and the fourth guide extend from the central portion in opposite directions.

4. The differential carrier of claim 1, wherein the third guide and the fourth guide each curve toward a general direction of the central opening.

5. The differential carrier of claim 1, wherein a first end of the third guide opposite of the central portion is positioned adjacent to the first feed opening.

6. The differential carrier of claim 1, wherein a first end of the fourth guide opposite of the central portion is positioned adjacent to the second feed opening.

7. An axle assembly comprising:
an axle housing defining a sump portion configured to house lubricant; and
a differential carrier coupled to the axle housing and configured to support a differential assembly, the differential carrier including an interior face facing the axle housing and a guide structure fixed to an upper portion of the interior face, the guide structure including:
a first guide extending laterally from a central portion of the guide structure, the first guide including a first distal end positioned adjacent a first feed opening defined by the interior face; and
a second guide extending laterally from the central portion of the guide structure, the second guide including a first distal end positioned adjacent a second feed opening defined by the interior face;
a third guide extending longitudinally from the central portion of the guide structure in a first direction; and
a fourth guide extending longitudinally from the central portion of the guide structure in a second direction.

8. The axle assembly of claim 7, further comprising a first guide extending laterally from a central portion of the guide structure, the first guide including a first distal end positioned adjacent a first feed opening defined by the interior face.

9. The axle assembly of claim 7, further comprising a second guide extending laterally from the central portion of the guide structure, the second guide including a first distal end positioned adjacent a second feed opening defined by the interior face.

10. The axle assembly of claim 7, further comprising:
a third guide extending longitudinally from the central portion of the guide structure in a first direction; and
a fourth guide extending longitudinally from the central portion of the guide structure in a second direction.

11. The axle assembly of claim 10, wherein the third guide and the fourth guide are longitudinally aligned.

12. The axle assembly of claim 10, wherein the first direction and the second direction are opposite directions.

13. The axle assembly of claim 7, wherein the guide structure extends axially from the interior face of the differential carrier so that the guide structure is configured to receive lubricant.

* * * * *